US009936422B2

(12) United States Patent
Ganu et al.

(10) Patent No.: US 9,936,422 B2
(45) Date of Patent: Apr. 3, 2018

(54) CLIENT ASSOCIATION MANAGEMENT FOR IMPROVING MU-MIMO TRANSMISSIONS

(71) Applicant: Aruba Networks, Inc., Sunnyvale, CA (US)

(72) Inventors: Sachin Ganu, San Jose, CA (US); Jin Xie, Sunnyvale, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 242 days.

(21) Appl. No.: 14/658,734

(22) Filed: Mar. 16, 2015

(65) Prior Publication Data

US 2016/0277972 A1    Sep. 22, 2016

(51) Int. Cl.
| | |
|---|---|
| H04W 28/10 | (2009.01) |
| H04W 40/02 | (2009.01) |
| H04L 12/725 | (2013.01) |
| H04L 12/721 | (2013.01) |
| H04L 12/891 | (2013.01) |
| H04W 28/08 | (2009.01) |

(52) U.S. Cl.
CPC ............. *H04W 28/10* (2013.01); *H04L 45/30* (2013.01); *H04L 45/38* (2013.01); *H04L 47/41* (2013.01); *H04W 40/02* (2013.01); *H04W 28/08* (2013.01)

(58) Field of Classification Search
CPC ......... H04L 45/30; H04L 45/38; H04L 47/41; H04W 28/10; H04W 40/02; H04W 28/08; H04W 28/0268
USPC ....................................................... 370/235
See application file for complete search history.

(56) References Cited

U.S. PATENT DOCUMENTS

| | | | | |
|---|---|---|---|---|
| 2006/0268793 | A1* | 11/2006 | Zanaty .................. | H04L 45/302 370/338 |
| 2007/0171868 | A1* | 7/2007 | Furuskar ............... | H04W 48/18 370/331 |
| 2008/0137615 | A1* | 6/2008 | Park ...................... | H04L 45/302 370/332 |
| 2009/0232061 | A1* | 9/2009 | Rajamani ............. | H04B 7/0697 370/329 |

(Continued)

*Primary Examiner* — Un C Cho
*Assistant Examiner* — Shah Rahman
(74) *Attorney, Agent, or Firm* — Hewlett Packard Enterprise Patent Department

(57) ABSTRACT

Devices, computer-program products, and methods for identifying two or more traffic flows with similar packet traffic characteristics are disclosed. In some implementations, the traffic flows may be transmittable over one or more wireless paths. In these implementations, the method may further include identifying a wireless path along which the two or more traffic flows may be transmitted. In some implementations, the method may further include determining whether the wireless path can implement spatial signal multiplexing. Making this determination may include using sounding information associated with the wireless path. In some implementations, the method may include grouping two or more traffic flows to transmit along the wireless path when the wireless path implements spatial signal multiplexing. In these implementations, the two or more traffic flows may be grouped according to similar packet traffic characteristics. Grouping the two or more traffic flows may allow spatial signal multiplexing on the wireless path.

24 Claims, 15 Drawing Sheets

(56) References Cited

U.S. PATENT DOCUMENTS

| | | | |
|---|---|---|---|
| 2009/0305701 A1* | 12/2009 | Giaretta | H04L 12/5692 455/435.1 |
| 2010/0091653 A1* | 4/2010 | Koodli | H04W 36/0027 370/235 |
| 2010/0188975 A1* | 7/2010 | Raleigh | G06Q 10/06375 370/230.1 |
| 2010/0195503 A1* | 8/2010 | Raleigh | H04L 41/0806 370/235 |
| 2011/0003606 A1* | 1/2011 | Forenza | H04B 17/318 455/501 |
| 2011/0044193 A1* | 2/2011 | Forenza | H04B 7/024 370/252 |
| 2011/0189997 A1* | 8/2011 | Tiwari | H04W 36/26 455/443 |
| 2012/0051351 A1* | 3/2012 | Lee | H04W 48/20 370/338 |
| 2012/0128090 A1* | 5/2012 | Seok | H04W 48/20 375/267 |
| 2012/0314694 A1* | 12/2012 | Hsieh | H04W 74/085 370/338 |
| 2013/0053039 A1* | 2/2013 | Jorguseski | H04W 24/02 455/436 |
| 2013/0279515 A1* | 10/2013 | Vijayasankar | H04L 47/805 370/462 |
| 2014/0036666 A1* | 2/2014 | Sanda | H04L 47/805 370/230 |
| 2014/0098671 A1* | 4/2014 | Raleigh | H04M 15/80 370/235 |
| 2014/0148155 A1* | 5/2014 | Batta | H04W 36/0083 455/432.1 |
| 2014/0334293 A1* | 11/2014 | Narasimha | H04W 28/08 370/229 |
| 2014/0369198 A1* | 12/2014 | Rinne | H04W 40/02 370/235 |
| 2015/0207834 A1* | 7/2015 | Zhao | H04N 21/631 709/231 |
| 2015/0208286 A1* | 7/2015 | Ozturk | H04W 36/0022 370/331 |
| 2015/0236411 A1* | 8/2015 | Garrett | H04L 5/0048 370/338 |
| 2015/0358237 A1* | 12/2015 | Persson | H04W 48/18 370/235 |
| 2016/0062795 A1* | 3/2016 | Hu | H04L 47/783 718/104 |
| 2016/0078756 A1* | 3/2016 | Basalamah | G08G 1/0112 701/117 |
| 2016/0127230 A1* | 5/2016 | Cui | H04W 40/02 370/389 |
| 2016/0135222 A1* | 5/2016 | Jain | H04W 74/04 370/329 |
| 2016/0192265 A1* | 6/2016 | Lim | H04W 36/14 370/332 |
| 2016/0234099 A1* | 8/2016 | Jiao | H04L 45/02 |

* cited by examiner

CLIENT ASSOCIATION MANAGEMENT FOR IMPROVING MU-MIMO TRANSMISSIONS

SUMMARY

Devices, computer-program products, and methods (e.g., computer-implemented methods) for identifying two or more traffic flows with similar packet traffic characteristics are disclosed. In some implementations, the traffic flows may be transmittable over one or more wireless paths. In these implementations, the method may further include identifying a wireless path along which the two or more traffic flows may be transmitted. In some implementations, the method may further include determining whether the wireless path can implement spatial signal multiplexing. In these implementations, making this determination may include using sounding information associated with the wireless path. In some implementations, the method may include grouping two or more traffic flows to transmit along the wireless path when the wireless path implements spatial signal multiplexing. In these implementations, the two or more traffic flows may be grouped according to similar packet traffic characteristics. Grouping the two or more traffic flows may allow spatial signal multiplexing on the wireless path.

In some implementations, packet traffic characteristics may include a packet size and a packet inter-arrival time. In other implementations, grouping the two or more traffic flows may also include steering traffic flows that do not have similar packet traffic characteristics to a wireless path not used for grouping the two or more traffic flows.

In some implementations, the method may include instructing a selected wireless path to imitate the identity of another wireless path. In these implementations, both the selected and the other wireless path are wireless paths along with the two or more traffic flows are transmitted. In some implementations, the method may include obtaining sounding information for the one or more traffic flows that are being transmitted along the other wireless path. In some implementations, the method may include determining whether to steer at least one of the two or more traffic flows from the other wireless path to the selected wireless path. In some implementations, the method may further include determining, from the sounding information, that moving at least one of the traffic flows allows spatial signal multiplexing on the selected wireless path. In some implementations, the method may further include grouping at least one traffic flow by steering the at least one traffic flow to transmit along the selected wireless path. In other implementations, the method includes determining that moving at least one traffic flow reduces overall utilization of the system, and not grouping the at least one traffic flow along the selected wireless path.

In some implementations, the method may include steering one or more of the two or more traffic flows to another wireless path. In these implementations, doing so may improve overall utilization of the system. In other implementations, the method may include identifying a wireless path along no traffic flows being transmitted along it, and disabling this identified wireless path.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that although the present system and methods have been specifically disclosed by embodiments and optional features, modification and variation of the concepts herein disclosed may be resorted to by those skilled in the art, and that such modifications and variations are considered to be within the scope of the systems and methods as defined by the appended claims.

BRIEF DESCRIPTION OF THE DRAWINGS

Illustrative embodiments are described in detail below with reference to the following figures.

DETAILED DESCRIPTION

The present disclosure generally relates to increasing the use of Multi-User, Multiple-Input, Multiple-Output (MU-MIMO) transmission between access points and client devices. Specifically, systems and methods are disclosed for grouping client devices with similar traffic flows with the same access point in order to optimize use of MU-MIMO transmissions.

MU-MIMO is a technology that allows a transmitting device, such as an access point, to simultaneously transmit to multiple receiver devices, such as client devices, at the same time. Prior to the development of MU-MIMO, an access point could only communicate with one associated client device at a time. When multiple client devices were associated with one access point, the access point would communicate with each client device in turn. This can become problematic when many client devices associate with the same access point, and/or the amount of data being transmitted between the access point and the client devices becomes large.

MU-MIMO allows the access point to communicate with multiple client devices at the same time, and thus may improve the throughput to the client devices. MU-MIMO, however, is most effective when the traffic flows to the client devices associated with one access point have similar traffic characteristics. When the traffic flows do not have similar characteristics, activating MU-MIMO may not improve the throughput to the client devices, and so the access point may choose not to enable MU-MIMO. Grouping client devices with traffic flows that have similar characteristics at the same access point may thus encourage the access point to enable MU-MIMO.

I. Network Configurations

Figure 1:
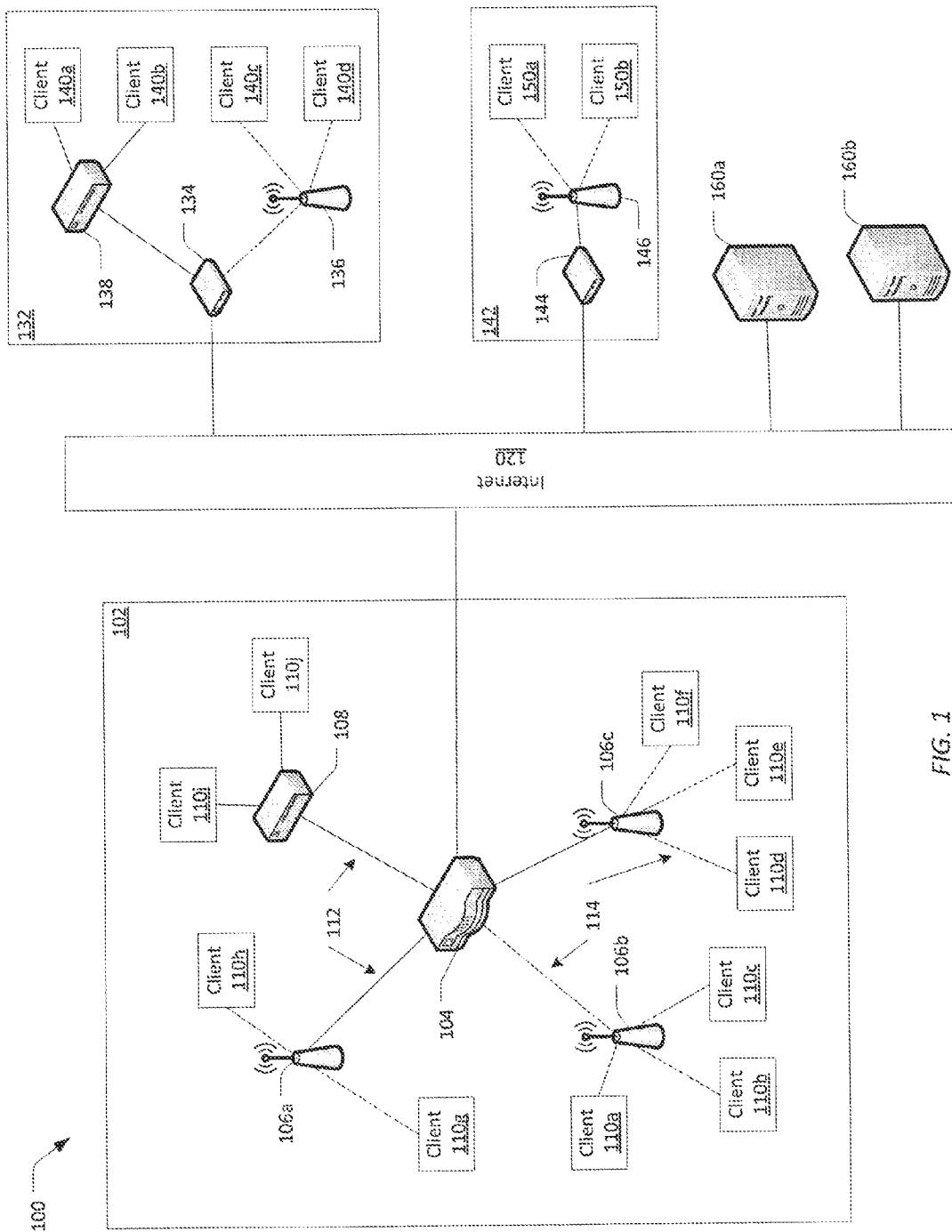
FIG. 1 illustrates one embodiment of a network configuration that may be implemented for a multi-user organization, such as a business, educational institution, governmental entity, or any other organization having multiple users and possibly multiple sites.

FIG. 1 illustrates one embodiment of a network configuration 100 that may benefit from the grouping of client devices and the activation of MU-MIMO. The network configuration 100 may be implemented for a multi-user organization, such as a business, educational institution, governmental entity, or any other organization having multiple users and possibly multiple sites. The network configuration 100 includes a main office 102 in communication with another network, here illustrated as the Internet 120 by way of example. The network configuration 100 may also include one or more remote sites 132, 142 also in communication with the Internet 120. In the illustrated embodiment, the main office 102 includes a controller 104 in communication with the Internet 120. The controller 104 may provide communication with the Internet 120 for the main office 102, though it may not be the only point of communication with the Internet 120 for the main office 102. A single controller 104 is shown as an example and not a limitation. It is understood that a main office 102 may include multiple controllers and/or multiple communication points with the Internet 120.

A controller 104 may be any device that is operable to configure and manage a network, such as the network at the main office 102 and also the larger network including the remote sites 132, 134. Alternatively or additionally, the controller 104 may be operable to configure or manage a group of one or more network devices. The controller 104 may be operable to configure switches, routers, access points, and/or client devices connected to the network. The controller 104 may itself be, or provide the functionality of, an access point.

The controller 104 may be in communication with one or more routers 108 and/or wireless access points 106a-c. Routers 108 and wireless access points 106a-c can provide network connectivity to various client devices 110a j. Using a connection to a router 108 or access point 106a-c, a client device 110a-j is able to access network resources, including communicating with other devices on the network or the Internet 120.

Client devices 106a-c include any hardware device that includes processing circuitry running at least one process adapted to control the flow of traffic into the device. Client devices may also include user input and output interfaces and communication interfaces, such as a radio for wireless communication and/or a physical connector for a wired communication. Examples of client devices include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions, content receivers, set-top boxes, personal digital assistants (PDAs), mobile phones, smart phones, smart terminals, dumb terminals, virtual terminals, video game consoles, and the like.

Within the main office 202, a router 108 is included as one example of a point of access to the network for wired client devices 110i-j. Client devices 110i-j connect to the router 108 and are able to access the network, or the Internet 120, through the router 108. Client devices 110i-j may communicate with the router 108 over a wired 112 connection. In the illustrated example, the router 108 communicates with the controller 104 over a wired 112 connection.

Wireless access points 106a-c are included as another example of a point of access to the network for client devices 110a-h. An access point 106a-c is a combination of hardware, software, and/or firmware that is configured to provide wireless network connectivity to wireless client devices 110a-h. In the illustrated embodiment, the access points 106a-c can be managed and configured by the controller 104. The access points 106a-c communicate with the controller 104 over either wired 112 or wireless 114 connections.

The network configuration 100 may include one or more remote sites 132, 142. A remote site 132 may be located in a different physical or geographical location from the main office 102. In some cases the remote site 132 is in the same geographical location, or possibly the same building, as the main office, 102, but lacks a direct connection to the network located within the main office 102. A remote site 132 such as the one illustrated may comprise, for example, a satellite office. The remote site 132 may include a device for communicating with the Internet 120, such as for example a cable modem 134. The remote site 132 may also include a router 138 and/or access point 136 in communication with the cable modem 134 over either wired or wireless connections. The router 138 and access point 136 provide connectivity to the network for various client devices 140a-d.

In various embodiments, the remote site 132 is in direct communication with main office 102, such that client devices 140a-d at the remote site 132 access the network resources at the main office 102 as if these clients 140a-d were located at the main office 102. In such embodiments, the remote site 132 is managed by a controller 104 at the main office, and the controller 104 provides the necessary connectivity, security, and accessibility that enables the remote site's 132 communication with the main office 102.

In various embodiments, the network configuration 100 may include one or more smaller remote sites 142, having only a modem 144 for communicating with the Internet 120 and a wireless access point 146, by which various client devices 150a-b access the Internet 120. Such a remote site 142 may represent, for example, an individual employee's home or a temporary remote office. The remote site 142 may also be in direct communication with the main office 102, such that the client devices 150a-b at remote site 142 access network resources at the main office 102 as if these client devices 150a-b were located at the main office 102. The remote site 142 may be managed by the controller 104 at the main office 102 to make this transparency possible.

The network configuration 100 includes the Internet 120, and thus may also include various content servers 160*a-b*. Content servers 160*a-b* may include various providers of multimedia downloadable and/or streaming content, including audio, video, graphical, and/or text content, or any combination thereof. Examples of content servers 160*a-b* include, for example, websites, streaming radio and video providers, and cable and satellite television providers. The client devices 110*a* j, 140*a-d*, 150*a-b* may request and access the multimedia content provided by the content servers 160*a-b*.

Figure 2:
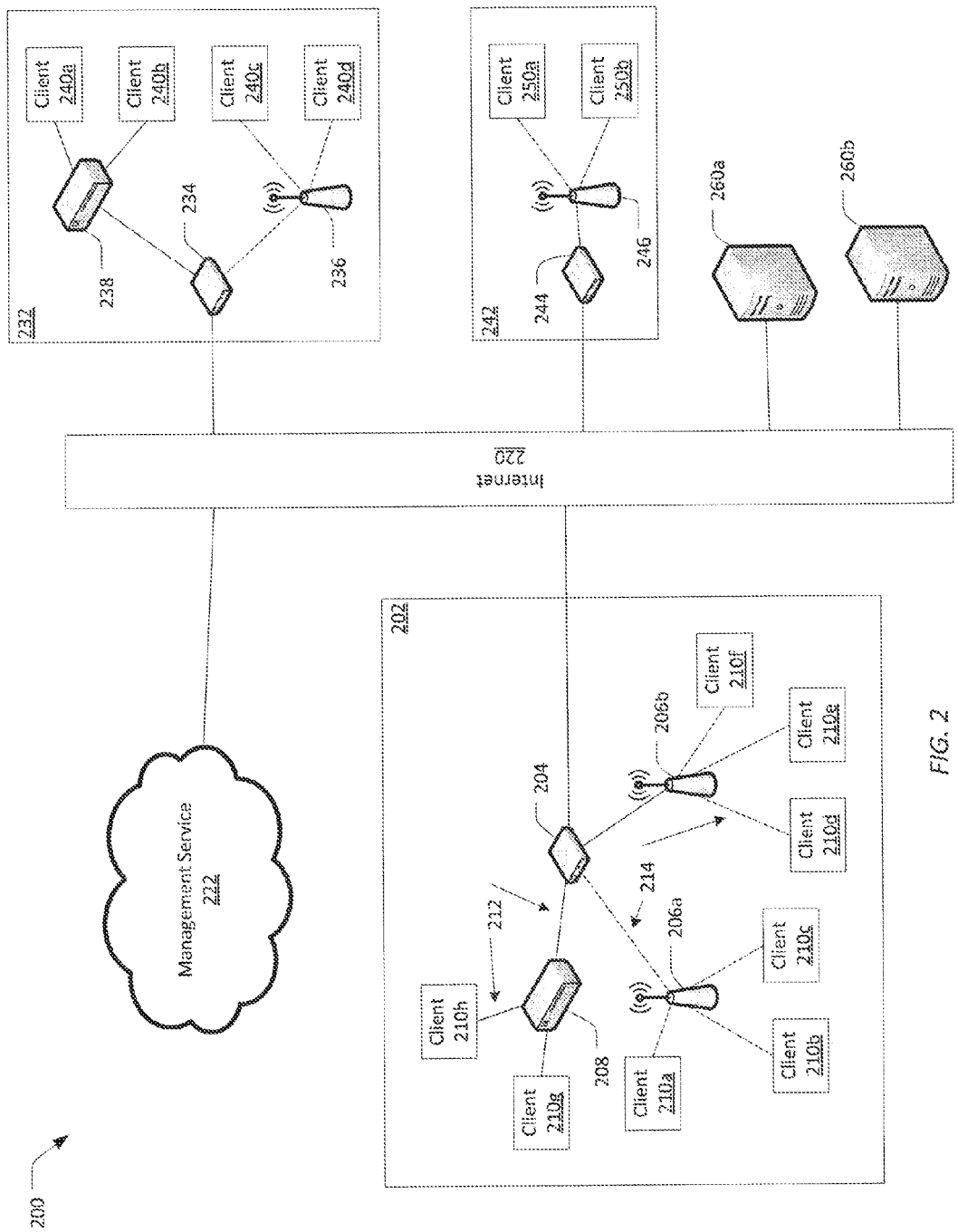
FIG. 2 illustrates an embodiment of a network configuration that includes a cloud-based management service.

FIG. 2 illustrates another embodiment of a network configuration 200 that includes a cloud-based management service 222. This network configuration 200 includes a cloud management service 222. The network configuration 200 may be implemented for a multi-user organization. The network configuration 200 includes a main office 202 in communication with the Internet 220, and may also include one or more remote sites 232, 242, also in communication with the Internet 220. In the illustrated embodiment, the main office 202 includes a modem 204 for communicating with the Internet 220. A single modem 204 is shown as an example and not a limitation. It is understood that that a main office 202 may include multiple modems and/or multiple communication points with the Internet 220.

The modem 204 may be in communication with one or more routers 208 and/or wireless access points 206*a-b*. Routers 208 and access points 206*a-b* provide network connectivity to various client devices 210*a-h*. Using a connection to a router 208 or access point 206*a-b*, a client device 210*a-h* is able to access network resources, including other devices on the network and the Internet 220.

A router 208 is included as an example of a point of access to the network for client devices 210*g-h*. Client devices 210*g-h* may communicate with the router 208 over a wired 212 connection. Wireless access points 206*a-b* are includes as another example of a point of access to the network for client devices 210*a-f*. Client devices 210*a-f* may communicate with the access points 206*a-b* over wireless 214 connections. The access points 206*a-b* may themselves communicate with the modem 204 over either wired 212 or wireless 214 connections.

In some embodiments, the network configuration 200 may include a cloud-based management service 222. The management service 222 may include various software and software processes for managing the network at the main office 202. Management tasks may include, for example, access, authentication, security, hardware management, and/or internal and/or external communication. The management service 222 may be running on a server local to the main office 202, a server located remotely from the main office 202, or may be distributed across any number of local and/or remote servers. In embodiments where the management service 222 is located remote to the main office 202, the management service 222 may access the main office 202 over the Internet 220.

The network configuration 200 may include one or more remote sites 232, 242. A remote site 232 may include a modem 234 for communicating with the Internet 220. The remote site 232 may also include a router 238 and/or access point 236 in communication with the modem 234 over either wired or wireless connections. The router 238 and access point 236 provide connectivity to the network for various client devices 240*a-d*.

In various embodiments, the remote site 232 may be managed by the management service 222, such that client devices 240*a-d* at the remote site 232 access the network resources at the main office 202 as if these clients 240*a-d* were located at the main office 202. The management service 222 provides the necessary connectivity, security, and accessibility that enables the remote site's 232 communication with the main office 202.

In various embodiments, the network configuration 200 may also include one or more smaller remote sites 242, having only a modem 244 for communicating with the Internet 220 and a wireless access point 246, by which various client devices 250*a-b* access the Internet 220. The remote site 242 may also be managed by the management service 222, such that the client devices 250*a-b* at the remote site 242 access network resources at the main office 202 as if these client devices 250*a-b* were located at the main office 202. The management service's 222 control over the remote site 242 makes this transparency possible.

The network configuration 200 includes the Internet 220, and thus may also include various content servers 260*a-b*. The client devices 210*a-h*, 240*a-d*, 250*a-b* may request and access multimedia content provided by the content servers 260*a-b*.

II. Client Match

Figure 3:
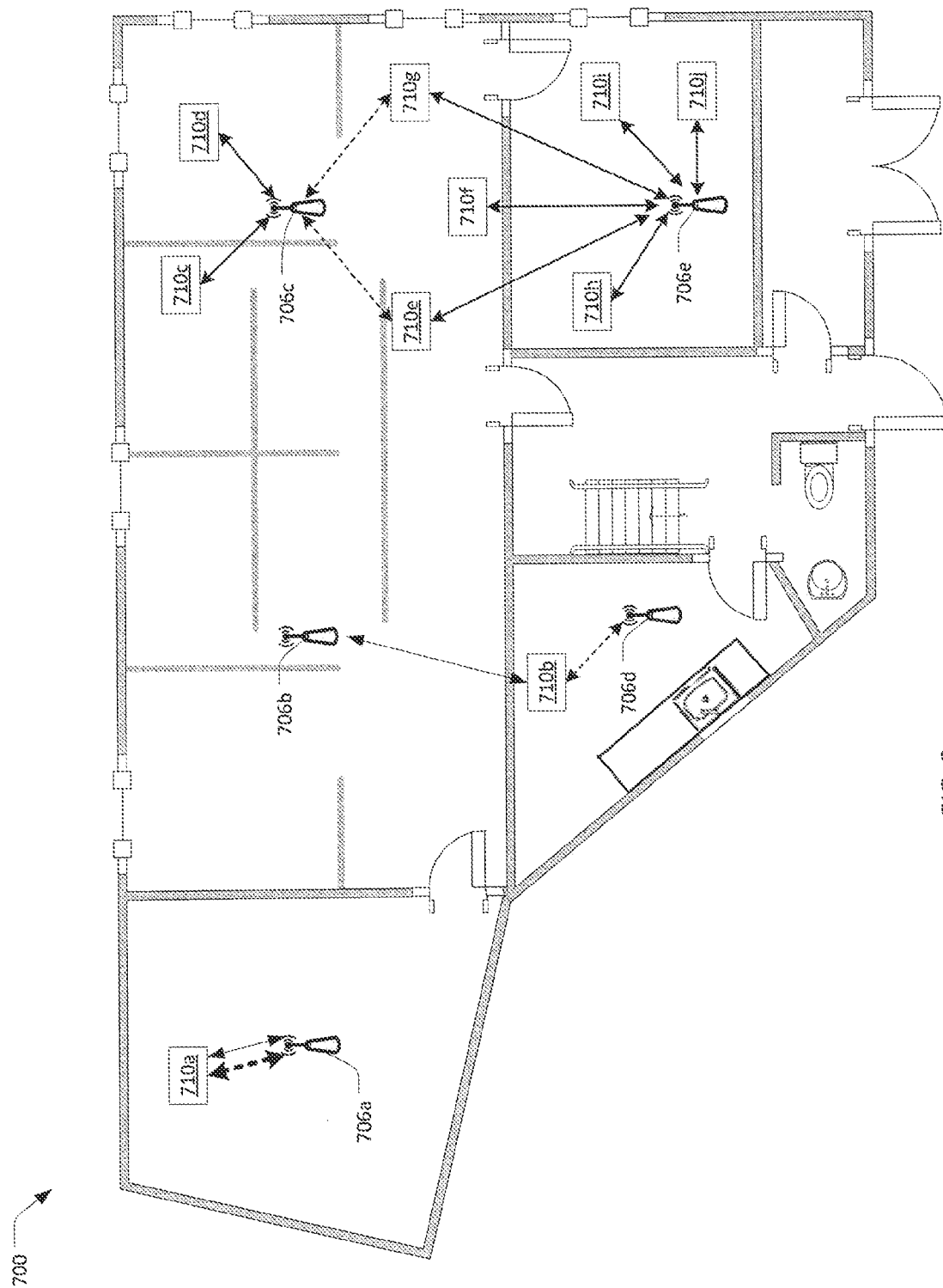
FIG. 3 illustrates one example of a floor plan such as may be found in the main office illustrated in FIGS. 1 and 2.

FIG. 3 illustrates one example of a floor plan 700 such as may be found in the main office 102, 202 illustrated in FIGS. 1 and 2. A portion of the network configuration 100, 200 as described in FIGS. 1 and 2 may be implemented on the illustrated floor plan 700 of FIG. 3. FIG. 3 illustrates where some of the access points 706*a-e* of the network configuration 100, 200 may be placed around the floor plan 700 in order to provide wireless service for users of the space. In the illustrated example, the floor plan 700 includes five access points 706*a*-706*e* distributed across the floor such that the entire floor plan 700 is provided with wireless coverage.

Any number of wireless client devices 710*a*-710*j* may be present within the floor plan 700 at any given time. Wireless client devices may connect to a network by associating with any available access points 706*a-e*. Typically, client devices determine connectivity decisions for themselves. For example, client devices may choose which access point to associate with, what speed at which to send and receive data, and when to change access points as the client device moves from one location to another (often referred to as "roaming"). Client devices, however, lack a system-level view of the network, and thus are not ideally placed to make decisions that improve utilization of overall network resources. For example, a client device may connect to the first access point it hears, rather than the access point, from among nearby access points, with the most available bandwidth. The client device thus may not receive the best available network performance, and/or may degrade the performance of the network for other client devices when the access point it has chosen is particularly crowded. The client device may also maintain the connection to an access point—a situation sometimes referred to as "stickiness"— even as the client device moves away from the access point. As the client device moves further away from the access point the client device's transmission and reception performance may degrade.

One method for improving the overall utilization of a wireless network is a technology called client match. A network that implements client match monitors each client device's capabilities and connection to the network, and attempts to match each client device to the best available radio on the best available access point. The network also continuously or periodically monitors each client device, and reacts to the client device's behavior as the client device and network conditions change. For example, when a client device moves into another access point's coverage area, or interference causes the client device's performance to drop, client match will typically automatically move the client to an access point or channel that can deliver better performance. Because client match has a system-level view, a network implementing client match can track the capabilities and performance of each client device. The network can develop this view by leveraging all the access points on a network to dynamically gather information on a client device's capabilities and behavior, such as signal strength and channel utilization. A system implementing client match can also aggregate and share client information across access points, and coordinate access points to make a best effort to connect each client to the access point that may provide the best service.

Client match provides at least three capabilities to a wireless network: band steering, client steering, and dynamic load balancing.

In FIG. 3 the, client device 710a illustrates band steering. Band steering provides the network with the ability to steer clients between radiofrequency bands provided by an access point. Band steering can be used when multi-band capable client devices connect to the network. In the illustrated example, the client device 710a is a dual-band device. The client device 710a has chosen to associate with access point 706a using a 2.4 GHz radio on the access point 706a, where the 2.4 GHz radio provides a 20 MHz channel. The access point 706a, however, also has a 5 GHz radio with a 40 MHz channel with equally good signal strength. The 5 GHz radio, because of the higher frequency, provides higher bandwidth, and thus a greater data rate. In this situation client match may cause the client device 710a to be steered from the 2.4 GHz radio to the 5 GHz radio.

Client steering is used to direct a client device with sub-optimal performance to a better connection. The client device 710b illustrates one example where client steering can be used to improve the network performance of the client device 710b. At some point, client device 710b decided to associate with access point 706b. At later time, client device 710b moved from one room to another, placing the client device 710b closer to access point 706d. The client device 710b, however, maintained its connection with access point 706b, even though it is now closer to access point 706d. The closer access point 706d can provide a stronger signal than the more distant access point 706b. In this situation, client match may cause the client device 710b to be steered from the access point 706b to access point 706d. Client steering typically uses existing mechanisms in the protocol between client devices and access points, for maximum compatibility across different client devices.

Dynamic load balancing addresses client density and stickiness by dynamically distributing client devices across available access points and channels. This ensures that individual access points are not overtaxed and network and client performance is continually improved. Access point 706e illustrates high client density. A number of client devices 710e-j have decided to associate with this access point 706e. Meanwhile, nearby access point 706c has only two client devices 710c, 710d associated with it. Of the client devices 710e-j associated with access point 706e, at least two are as close to, or closer to, less congested access point 706c Client match may identify that these two client devices 710e and 710g can be just as well as or better served by access point 706c. Client match may thus steer the client devices 710e and 710g from access point 706e to 706c.

Steering client devices 710e and 710g may not in all cases improve performance of the network or transmission and reception for the client devices 710e and 710g. For example, it may be that client devices 710c, 710d associated with access point 706c have particular high traffic demand. For example, these client devices 710c, 710d may be streaming bandwidth intensive data, such as video, or drop-sensitive data, such as voice calls. In such cases, client match may recognize that overall network performance and individual client device performance may be better if the client devices 710e-j are left as they are.

Client match may be implemented, for example, by a controller, such as the controller 104 of the network configuration 100 of FIG. 1, or a cloud-based management service, such as the management service 222 of the network configuration 200 of FIG. 2. Alternatively or additionally, client match may be implemented by one or more access points as illustrated in either FIG. 1 or 2.

III. Multiple-Input and Multiple-Output (MIMO)

FIGS. 1 and 2 also illustrate that, quite often, multiple client devices associate with the same access point. The access point must service all associated client devices such that none of the client devices suffer noticeable communication delays. In prior systems, an access point could only communicate with a single client device at a time. In such systems, the access point would service each associated client device one at a time, and a client device would only be able to transmit and/or receive communications during its turn. A limitation of such systems is that, as the number of client devices associated with a single access point grows, and the amount of data communicated to and from each client device increases, the access point may not be able to service each client device sufficiently quickly to avoid noticeable interruptions in the flow of data to a client device.

Figure 4:
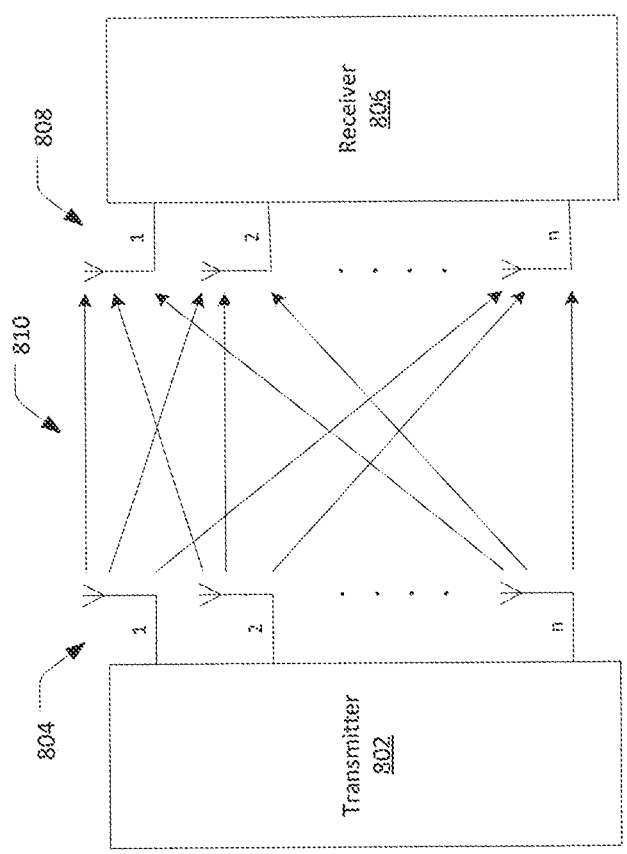
FIG. 4 illustrates generally a MIMO system.

Different technologies have been developed to increase the data throughput from access points to client devices. One such technology is multiple-input and multiple output (MIMO). FIG. 4 illustrates generally a MIMO system. A MIMO system uses multiple antennas 804, 808 at both the transmitter 802 and receiver 806 to improve communication performance. Employing multiple antennas has several benefits, including the ability to multiply the capacity of a radio link by exploiting multipath propagation: that is, by taking advantage of the differences in how the same signal 810, transmitted from different antennas 804, arrives at one or more receiver antennas 808.

MIMO-based system implementations either benefit from or require knowledge of channel state information (CSI) at the transmitter and/or receiver. Channel state information refers to known properties of a communication link. This information describes how a signal propagates from the transmitter to the receiver, and represents the combined effect of, for example, scatter, fading, and power decay with distance. The CSI makes it possible to adapt transmissions to current channel conditions and assists in achieving reliable communication with high data rates in multi-antenna systems.

MIMO technology can be subdivided into three main categories: pre-coding, spatial multiplexing, and diversity coding.

Pre-coding describes all spatial processing that occurs at the transmitter, including beamforming, the process of shaping the radio signal. In beamforming, the same signal is transmitted from each of the transmit antennas with appropriate phase and gain weighting such that the signal power is increased at the receiver. Beamforming increases the received signal gain by making signals emitted from different antennas add up constructively, thus reducing multipath fading effects. When a receiver has multiple antennas, transmit beamforming may not be able to simultaneously improve the signal level at all of the receive antennas, so pre-coding with multiple streams may be beneficial. Pre-coding generally requires that the transmitter and receiver have the CSI about the signals between them.

In spatial multiplexing, a high-rate signal is split into multiple lower-rate streams and each stream is transmitted from a different transmit antenna in the same frequency channel. When these signals arrive at the receiver antenna array with sufficient different spatial signatures, and the receiver has accurate CSI, the receiver can separate the streams into nearly parallel channels. Spatial multiplexing may thus provide increased channel capacity at higher signal-to-noise ratios. The maximum number of spatial streams is limited by the lesser of the number of antennas at the transmitter or receiver. Spatial multiplexing can be used without CSI at the transmitter, but can be combined with pre-coding if CSI is available.

Diversity coding techniques can be used when the transmitter does not have CSI. In diversity coding, a single stream is transmitted, and the signal is coded using space-time coding techniques. The signal is emitted from each of the transmit antennas with full or near orthogonal coding. Each receive antenna thus receives divergent copies of the signal. Diversity coding exploits the independent fading in the multiple antenna links to enhance signal diversity. Because there is no channel knowledge, there is no beamforming or array gain from diversity coding. Diversity coding can be combined with spatial multiplexing when some channel knowledge is available to the transmitter.

IV. Multi-User, Multiple-Input and Multiple-Output (MU-MIMO)

In a MIMO system, as discussed above, an access point can still only communicate with a single client device at a time. Thus a more advanced version of MIMO, multi-user MIMO (MU-MIMO) was developed. MU-MIMO builds on MIMO concepts to provide a transmitter the ability to communicate simultaneously with multiple receivers. MU-MIMO applies an extended version of space-division multiple access (SDMA) to allow multiple transmitters to send separate signals and multiple receivers to receive separate signals simultaneously in the same band.

SDMA enables creating parallel spatial data signals through spatial multiplexing and/or diversity. SDMA relies on a multiple antenna array at the transmitter, and leverages the spatial location of the receivers. The transmitting antennas apply beamforming to the signals; that is, the antennas adapt the radiation pattern of the signal to obtain the highest gain in the direction of a specific receiver. This is often done using phased array techniques. The receiver also has multiple antennas, and applies additional filtering to the received signals to distinguish the spatially distributed signals.

Figure 5A:
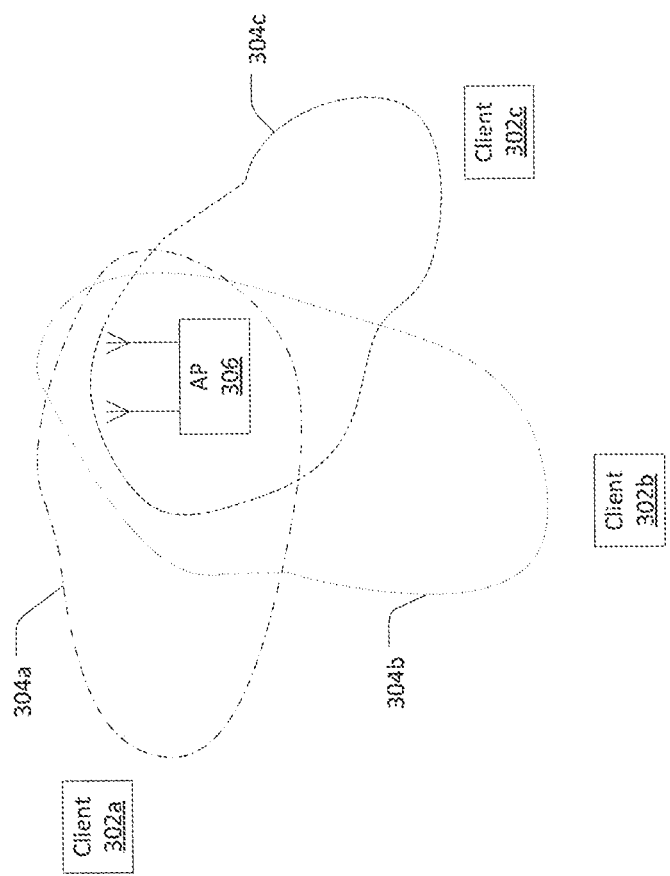
FIG. 5A provides an illustration of a transmitter, such as an access point, having multiple antennas and simultaneously transmitting to multiple receivers, such as client devices.

FIG. 5A provides an illustration of a transmitter, such as an access point 306, having multiple antennas and simultaneously transmitting to multiple receivers, such as client devices 302a-c. Having multiple antennas allows the access point 306 to apply beamforming to a transmitted signal 304a-c. For example, for given a client device 302a, the access point 306 may shape the transmitted signal 304a such that the signal is stronger in the direction of the client device 302a than in other directions. The access point 306 can also take advantage of the spatially diverse locations of the client devices 302a-c and spatial multiplexing to simultaneously broadcast to all the client devices 302a-c. The client devices 302a-c, also have multiple antennas so that they can receive the beamformed signal, and may apply filtering to the incoming signals 304a-c to distinguish the signals are meant for it.

To implement MU-MIMO, the access point 306 will acquire CSI for each of the client devices 302a-c associated with it. The access point 306 may acquire CSI through a process generally called sounding: the access point 306 sends a known pattern of radio frequency symbols from each of its antennas; the client devices 302a-c receive the pattern and construct a matrix for how each of the receive antennas hear each transmit antenna. The client devices 302a-c transmit this information back to the access point 306, and the access point 306 uses the matrix to determine optimum amplitude-phase settings for each client device 302a-c.

Figure 5B:
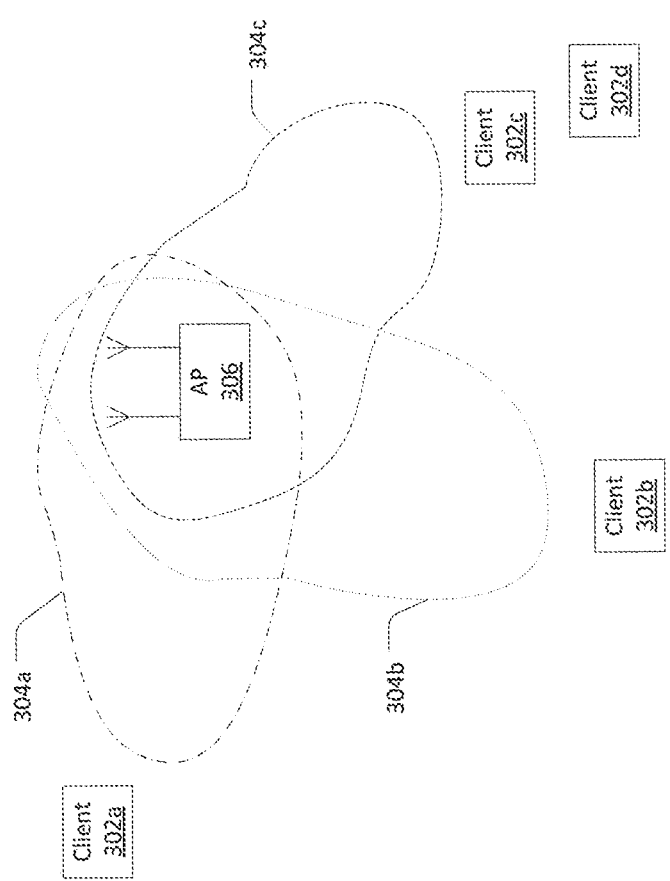
FIG. 5B illustrates one example where there is not sufficient spatial diversity between the client devices for MU-MIMO to be activated.

MU-MIMO cannot be applied in all situations, however. FIG. 5B illustrates one example where there is not sufficient spatial diversity between the client devices 302a-d for MU-MIMO to be activated. In the illustrated example of FIG. 5B, a client device 302d is too close to another client device 302c for the access point 306 to generate a beamformed signal to both client devices 302c, 302d. Because MU-MIMO employs all of the antennas at the access point 306, in order to service the associated client devices 302a-d in this example, the access point 306 would have to disable MU-MIMO and use non-MU-MIMO techniques to serves all the client devices 302a-d. Alternatively, the inconveniently placed client device 302d can be associated with another nearby access point, thus providing the illustrated access point 306 with a good scenario for activating MU-MIMO.

V. Traffic Flows

Figure 6:
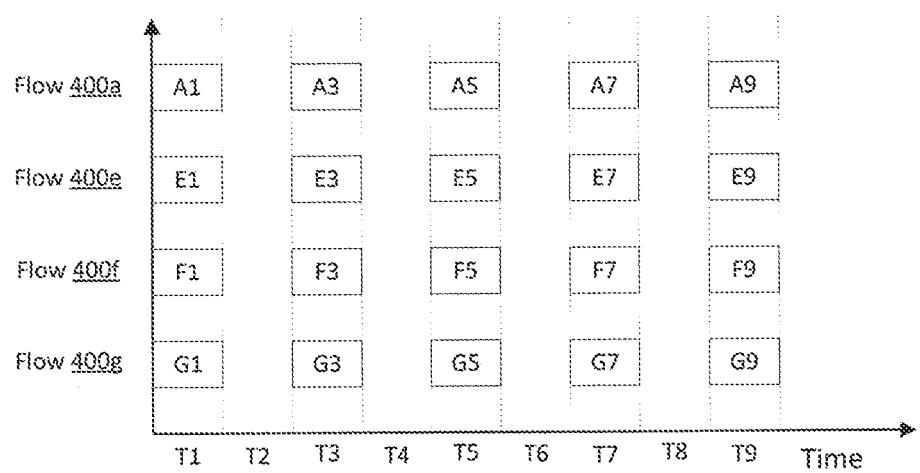
FIG. 6 illustrates one example of four traffic flows with similar packet sizes and packet inter-arrival times.

Other factors affect the practicality of activating MU-MIMO at a given access point. One of those factors is the characteristics of the packets being transmitted through an access point to the client devices associated with that access point. FIG. 6 illustrates on a graph one example of four traffic flows 400a-d that may be transmitted to four different client devices. A traffic flow is the flow of data to a client device, and may comprise audio, video, graphics, text, webpages, any combination of these data types, or some other data type. A traffic flow may include a single packet of data, multiple packets of data that together make up a single set of data, multiple packets of data for different sets of data, and/or a continuous stream of packets, also called streaming data, composed of a large number or undefined number of packets.

Each traffic flow 400a-d has at least two characteristics: a packet size and a packet inter-arrival time. For example, the packets for traffic flow 400a have a size such that the data for each packet arrives within one time slot. The packets for traffic flow 400a arrive in every other time slot, meaning that packet A1 arrives at time slot T1 and packet A2 arrives two time slots later, in time slot T3. Hence, the packets for traffic flow 400a have an inter-arrival time of two time slots. Traffic flows 400e, 400f, and 400g have packet characteristics that are similar to that of traffic flow 400a. Thus for traffic flows 400e, 400f, and 400g, the size of the packets is such that the data arrives within one time slot, and the packet inter-arrival time is two time slots.

FIG. 6 illustrates one embodiment that may implement MU-MIMO. As discussed above, MU-MIMO involves transmitting to multiple receivers at the same time. Because all the transmitting antennas are being used at the same time, the access point will transmit a similar amount of data to all the client devices. MU-MIMO is thus effective when the packets in each of the traffic flows have similar characteristics. FIG. 6 illustrates an example of traffic flows with packets that are similar in size and have similar inter-arrival times. At time T1, a packet has arrived for each of the traffic flows. Thus, at time T1 the access point is able to transmit the same amount of data to all the client devices at the same time. At time T2, no data has arrived for any traffic flow 400a, 400e-g, and thus the access point may remain idle. At time T3, once again a packet has arrived for each of the traffic flows, and the access point is able to transmit the same amount of data to all the client devices at the same time.

MU-MIMO can, however, operate even when the packet traffic characteristics for a group of client devices is not similar. When a group of traffic flows have dissimilar characteristics, however, MU-MIMO may not be as effective. Traffic flows with dissimilar characteristics are illustrated in FIG. 7.

Figure 7:
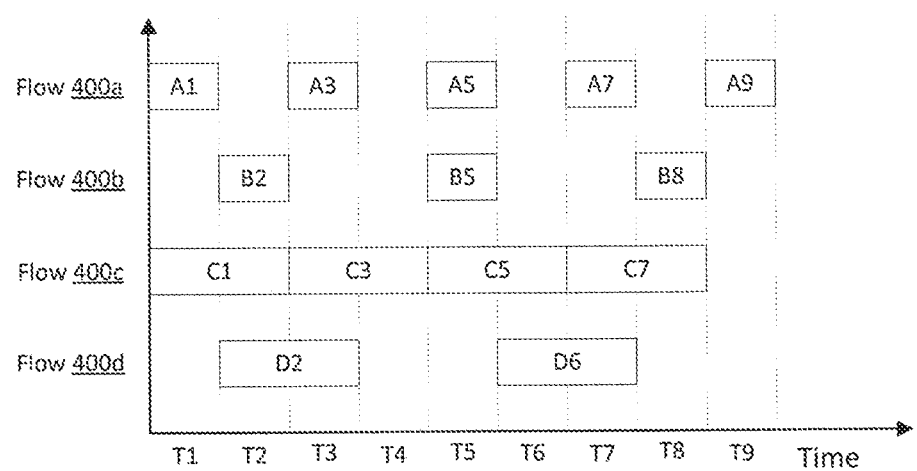
FIG. 7 illustrates on a graph one example of four traffic flows that may be transmitted from one access point to four different client devices.

In FIG. 7, traffic flow 400a has a packet size and packet inter-arrival time as described above with respect to FIG. 6. Continuing with FIG. 7, the packets for traffic flow 400b also have a size that fits within one time slot, and the packets have an inter-arrival time of three time slots. That is, the packet B2 arrives in time slot T2 and the packet B5 arrives three time slots later, in time slot T5. The packets of traffic flow 400c are larger than for either traffic flows 400a or 400b requiring two time slots to arrive. The packets for traffic flow 400c arrive with no delay between packets, but because of the size of the packets, the packets have an inter-arrival time of two time slots. Finally, the packets for traffic flow 400d are also large enough to require two time slots to arrive. The packets for traffic flow 400d arrive in every third time slot, and thus have an inter-arrival time of five time slots.

FIGS. 8A-8F illustrate transmission of the traffic flows illustrated in FIG. 7 through an access point that has enabled MU-MIMO. As will be explained in further detail below, a group of traffic flows such as is illustrated in FIG. 7 is not well-suited for MU-MIMO transmissions. FIGS. 8A-8F each illustrate the current state of the packets that have arrived at the access point at the end of a particular time slot. Also illustrated is the contents of a buffer 402 that may be implemented by the access point. The buffer 402 may store packets that are ready to be transmitted to the client devices. The first slot 402a in the buffer 402 reflects the next group of packets to be transmitted. Because the access point will transmit to all four client devices at the same time, the first slot 402a has space allocated for packets from each of the traffic flows 400a-d. The second 402b and subsequent slots store packets to be transmitted later. In FIGS. 8A-8F the contents of the buffer 402 are also illustrated in terms of how the contents change over time.

Figure 8A:
FIGS. 8A-8F illustrate transmission, over time, of the traffic flows illustrated in FIG. 7 from an access point that has enabled MU-MIMO.

FIG. 8A, illustrates time slot T1. At time T1 the first packet, packet A1, for traffic flow 400a has arrived at the access point. The first slot 402a of the buffer 402 now contains packet A1, and reflects the data that is to be transmitted to the client devices. The first buffer slot 402a, however, does not yet contain any data for traffic flows 400b, 400c and 400d. Should the access point transmit the contents of the first buffer slot 402a at time T1, the access point would send empty or null packets, or random data to the client devices for traffic flows 400b-d. The client devices may not be able to handle invalid data. Hence, the access point will send no data at time T1, and wait for additional packets to arrive.

Figure 8B:
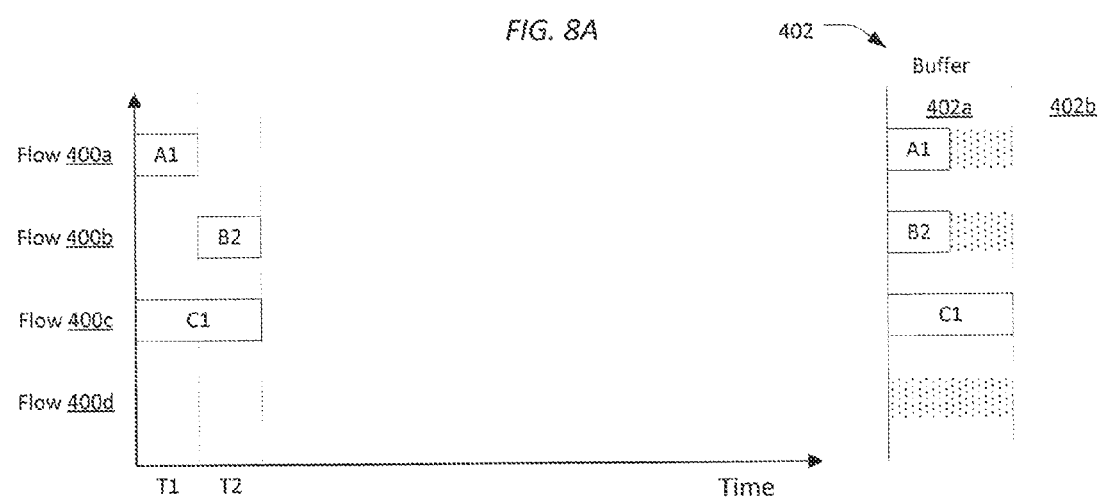

FIG. 8B illustrates the packets that have arrived at the access point in time slot T2. At time T2, the access point has received the first packet for both traffic flows 400b and 400c, but still lacks any data for traffic flow 400d. Moreover, the packet for traffic flow 400c is larger than the packets for traffic flows 400a and 400b. Should the access point transmit the contents of the first buffer slot 402a at time T2, the client devices for traffic flows 400a and 400b will each receive a packet, plus additional, invalid data. Receipt of invalid data may be a problem for some client devices. The access point thus may wait until the first buffer slot 402a contains as much data for each of traffic flows 400a and 400b as it has for traffic flow 400c.

Figure 8C:
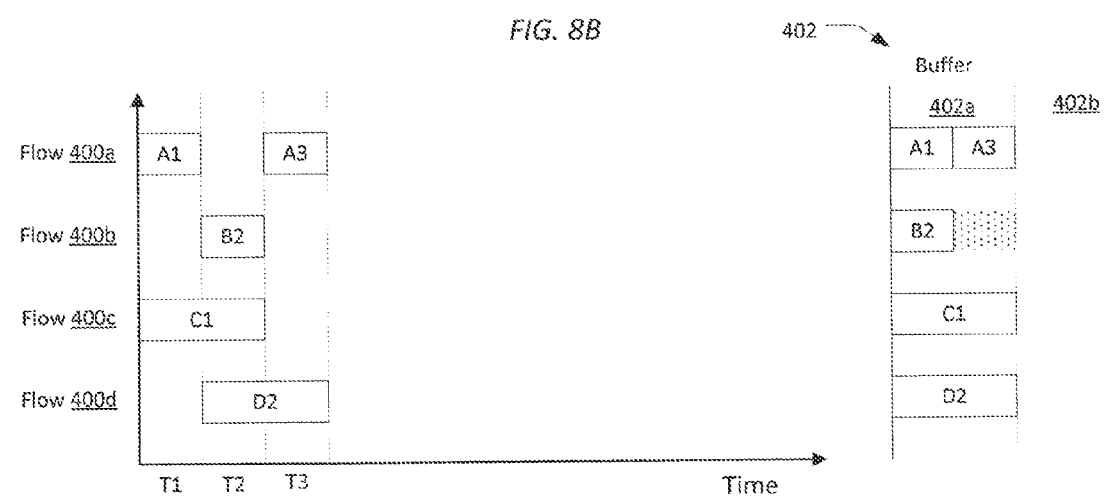

FIG. 8C illustrates the packets that have arrived at the access point in time slot T3. At time T3, the access point has received a second packet for traffic flow 400a, as well as the first packet for traffic flow 400d. At time T3, however, the first buffer slot 402a does not yet have sufficient data for traffic flow 400b. The first buffer slot 402a contains enough data for traffic flow 400a, because the first buffer slot 402a contains as much data for traffic flow 400a as it does for both traffic flows 400c and 400d. But should the access point transmit the contents of the first buffer slot 402a at time T3, the client device for traffic flow 400b will receive a packet and additional, invalid data. The access point thus may not transmit any data at time T3.

Figure 8D:
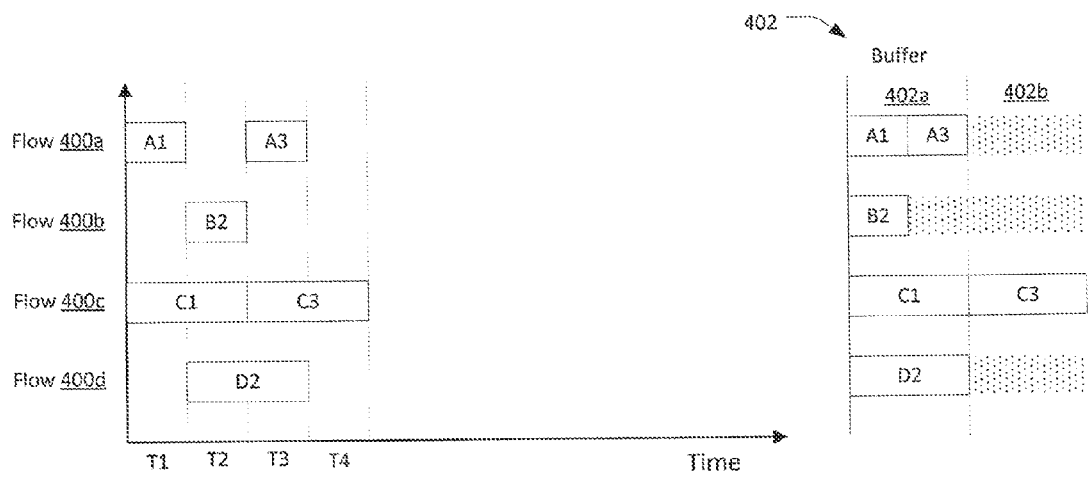

FIG. 8D illustrates the packets that have arrived at the access point in time slot T4. At time T5, another packet has arrived for traffic flow 400c. Because the previous packet for traffic flow 400c has not yet been transmitted, this second packet is placed in the second slot in the buffer 402. The first buffer 402 slot, however, does not yet have enough data for traffic flow 400b. Thus the access point will again transmit no data at time T4, and continue to wait for more data to arrive.

Figure 8E:
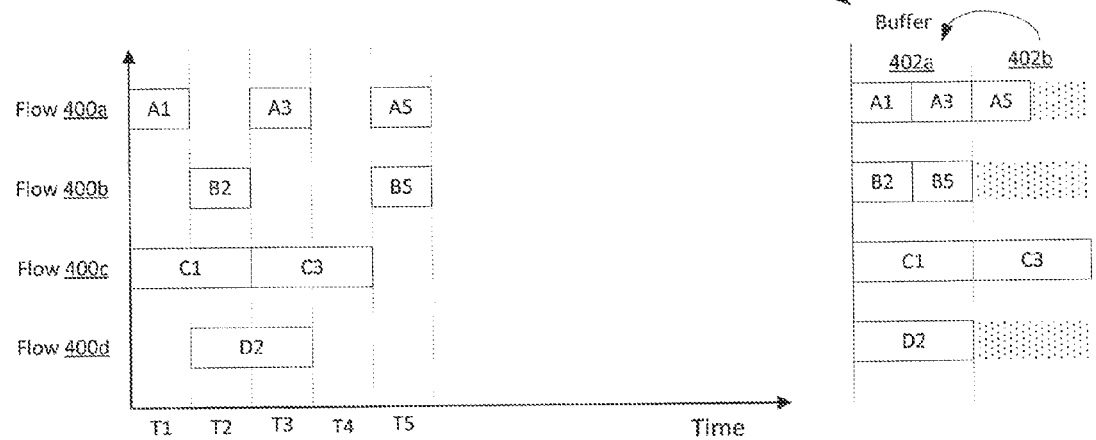

FIG. 8E illustrates the packets that have arrived at the access point in time slot T5. At time T5, packets have arrived for traffic flows A 400a and B 400b. The packets for traffic flow 400a now exceed the first buffer slot 402a, so the new packet is placed in the second buffer slot 402b. The packet for traffic flow 400b fills the remaining space in the first buffer slot 402a allocated for traffic flow 400b. Now the contents of the first buffer 402 slot are ready to be transmitted: the first buffer slot 402 contains data for all four client devices, and the data is similar in size. Thus, at time T5 the access point will transmit data to all of the client devices. This causes the first buffer slot 402a to be freed and the contents of the next buffer slot 402b to be moved to the first buffer slot 402a, as illustrated in FIG. 8F.

Figure 8F:
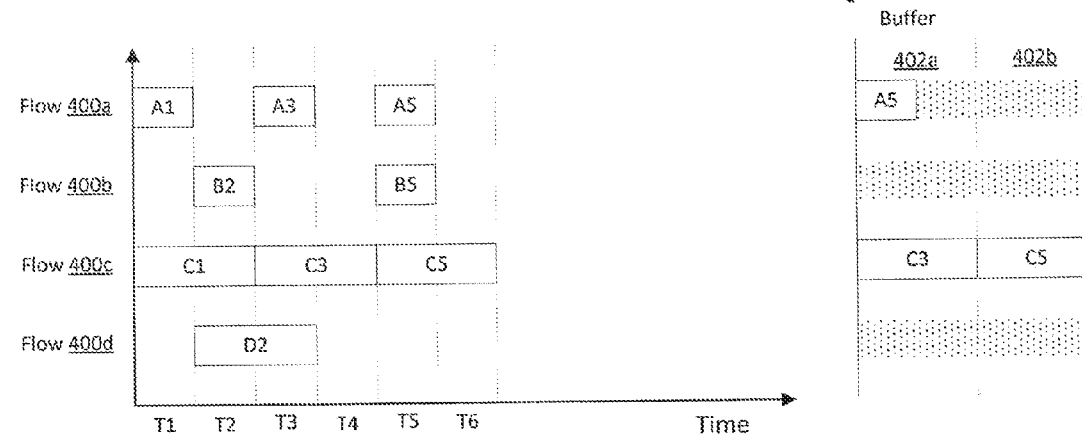

FIG. 8F illustrates the packets that have arrived at the access point in time slot T6. At this time, the access point has released one slot of data from the buffer 402. The data in the second slot 402b is advanced into the first slot 402a. The packet received at time T6, packet C5, is placed in the second buffer slot 402b, since the first buffer slot 402a for traffic flow 400c is occupied.

The example illustrated in FIGS. 8A-8F, demonstrates that traffic flows with different packet sizes and packet inter-arrival times are may not be suited for transmission using MU-MIMO. Packets to some client devices may be delayed until the access point has enough data to transmit to all the associated client devices. This delay may cause the client devices to suffer noticeable interruptions or excessive delays in the presentation of the data to a user. Grouping traffic flows with similar packet sizes and packet inter-arrival times at the same access point may lead to a more effective usage of MU-MIMO.

Other packet traffic characteristics may also or instead be considered to encourage usage of MU-MIMO. For example, access categories may also be considered. In some aspects, access categories define a priority for traffic flows that may be included within the access category. Traffic flows assigned to a higher priority access category may be allowed to send more packets more frequently than a lower priority access category. A contention window can also be set according to the traffic expected in each access category. For example, a wider contention window can be set for categories with larger amounts of traffic, such as video. Grouping traffic flows by their access category may also encourage usage of MU-MIMO by an access point at which the traffic flows are grouped. Traffic flows with the same access category may have similar contention windows, thus the flow of packets for these traffic flows may be similar as well.

VI. Improving MU-MIMO Transmissions

As noted above, MU-MIMO provides an access point the ability to transmit to multiple client devices at the same time, thus possibly improving overall throughput to all associated client devices. As also noted above, however, some configurations of traffic flows, client devices, and/or access points are better suited for MU-MIMO than others. Channel state information (CSI) collected by the available access points as well as knowledge of the traffic flows to the client devices can be used by a controller or other management service to build an overall understanding of the client devices currently associated with the network. Using client match, the controller can then group traffic flows with good characteristics for MU-MIMO transmissions at the same access point. The access point may then enable MU-MIMO. The controller can also group less suitable client devices with other access points. In some cases, these other access points can also enable MU-MIMO, while in other cases the controller recognizes that overall utilization of the system is better without MU-MIMO enabled at this other access point. Because the controller constantly maintains an overall view of the network configuration, the controller is able to dynamically adjust the configuration of the client devices and the access points as conditions on the network change. These conditions include, for example, the type, rate, and volume of packets in any given traffic flow, changes in the traffic flow to any of the client devices, client devices joining or leaving the network, and/or client devices moving from one location to another.

Figure 9A:
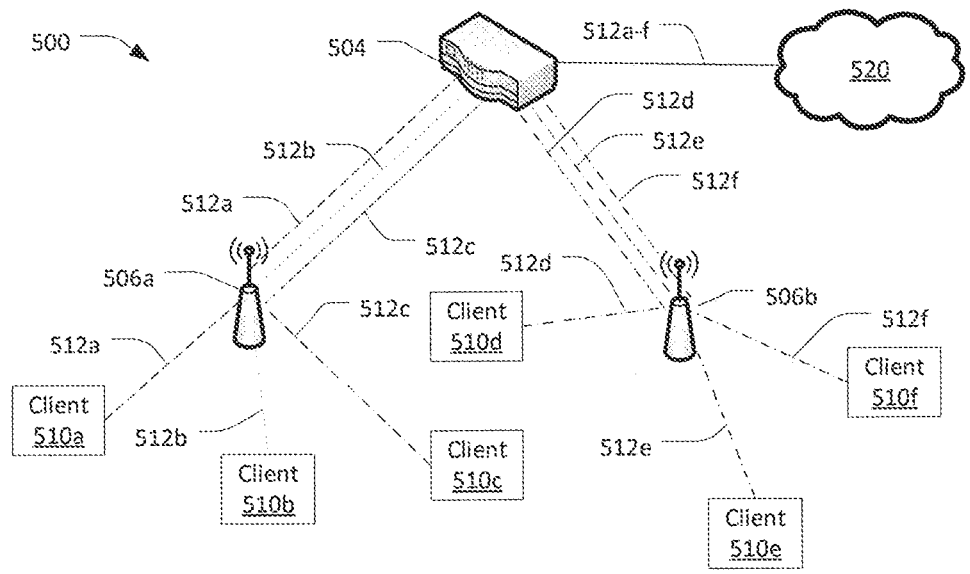
FIG. 9A illustrates one embodiment of a wireless network including multiple wireless access points, multiple client devices associated with those access points, and a controller.

FIG. 9A illustrates one embodiment of a wireless network 500 including multiple wireless access points 506a-b, multiple client devices 510a-f, and a controller 504. Each of the multiple client devices 510a-f are associated with one the access points 506a-b. In the illustrated example, client devices 510a, 510b, and 510c are associated with access point 506a, and client devices 510d, 510e, and 510f are associated with access point 506b.

Each client device 510a-f receives a traffic flow 512a-f, as described above, from a network 520 location. For example, the client device 510a receives the traffic flow 512a, which originates at a network 520 location, traverses the controller 504, and traverses the access point 506a in order to reach the client device 510a. As another example, the client device 510f receives the traffic flow 512f, which originates at a network 520 location, traverses the controller 504, and traverses the access point 506b to reach the client device 510f.

Each traffic flow 512a-f may have similar or different traffic characteristics, meaning similar or different packet sizes and packet inter-arrival times. In the example illustrated in FIG. 9A, traffic flow 512a has different characteristics than traffic flow 512b, and both have different characteristics from traffic flow 512c. For example, traffic flow 512a may have larger packets than traffic flow 512b. Further, traffic flows 512d, 512e, and 512f have similar traffic characteristics to each other but are not similar to either traffic flows 512a, or 512b. Traffic flow 512c has similar characteristics as traffic flows 512d-f. Traffic flows with similar characteristics are illustrated with dashed lines of the same style.

The network location 520 may be within the same network 500, or may be remote to the network 500. The source of the traffic flows 512a-f may be a content provider, such as a playback device or a server providing content over the Internet. Each traffic flow 512a-f may originate from a different provider, or at least some may be from the same provider, and/or may contain the same content.

Each traffic flow 512a-f traverses a path from the network location 520 to its respective client device 510a-f. For example, the path of the traffic flow 512a originates at a network location 520, includes the controller 504 and the access point 506a, and terminates at the client device 510a. Similarly, the path of the traffic flow 510f originates at a network location 520, includes the controller 504 and the access point 506b, and terminates at the client device 510f. The path of the traffic flows 512a-f may be at least in part over a wired connection and in part over a wireless connection. The path may traverse one or more additional intermediate devices, such as switches, routers, controllers, and/or access points. In the embodiment illustrated in FIG. 9A, the portion of a path from the controller 504 to the client device 510a-f is a wireless path.

As discussed above, traffic flows with similar traffic characteristics—that is, packet size and packet inter-arrival times—may be better suited for MU-MIMO transmissions. In the example illustrated in FIG. 9A, traffic flows 512d, 512e, and 512f have similar characteristics, and share the wireless path that include access point 506b. Hence, access point 506b can enable MU-MIMO. Traffic flows 512a, 512b, and 512 also share a wireless path, one that includes access point 506a, but because these traffic flows 512a-c do not have similar characteristics, access point 506a is not likely enable MU-MIMO.

FIG. 9A also illustrates one example of how the wireless network 500 can steer client devices, and thereby possibly improve overall utilization of the wireless network 500. As noted previously, traffic flow 512c traverses a wireless path that includes access point 506a, which may not enable MU-MIMO. Traffic flow 512c, however, has similar characteristics as traffic flows 512d, 512e, and 512f. As also noted above, traffic flows 512d-f traverse a wireless path that includes access point 506b, which may choose to enable MU-MIMO. Thus it may be advantageous to group the traffic flow 512c with the traffic flows 512d-f, so that traffic flow 512c also shares the same wireless path as traffic flows 512d-f.

Figure 9B:
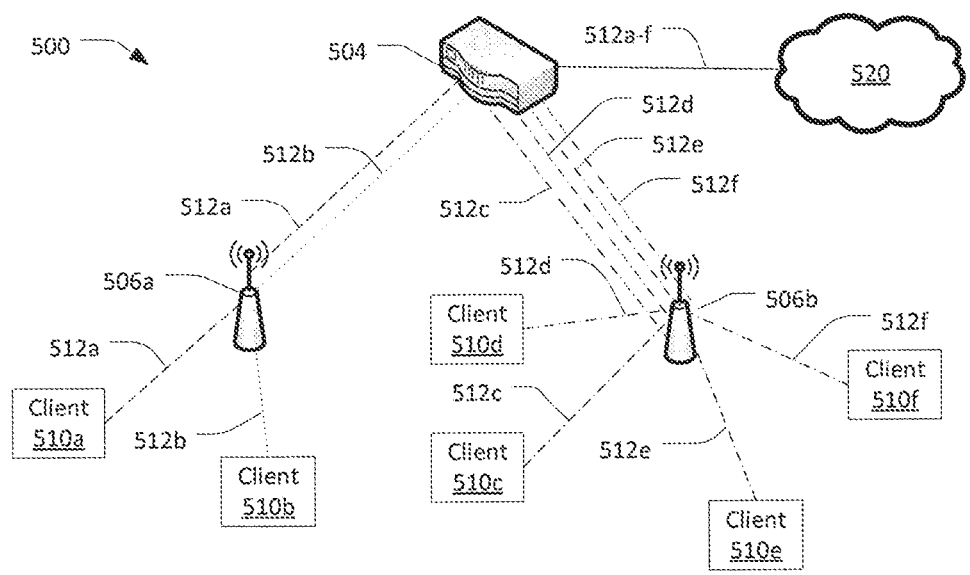
FIG. 9B illustrates the result of steering a client to an access point that has enabled MU-MIMO transmissions.

The controller 504 is able to monitor the traffic flows 512a-f to each of the client devices 510a-f, and thus may recognize that overall utilization of the wireless network 500 can be improved if the traffic flow 512c for client device 510c is steered to the wireless path that includes the access point 506b. The controller 504 may thus steer client device 510c, using client match, to disassociate from the access point 506a and associate instead with the access point 506b. FIG. 9B illustrates the result. Client 510c can now receive and transmit MU-MIMO transmissions, which may improve the throughput to the client device 510c. It should also be noted that the throughput to the client devices 510a and 510b may also improve, because the number of client devices associated with the access point 506a has decreased.

Figure 10A:
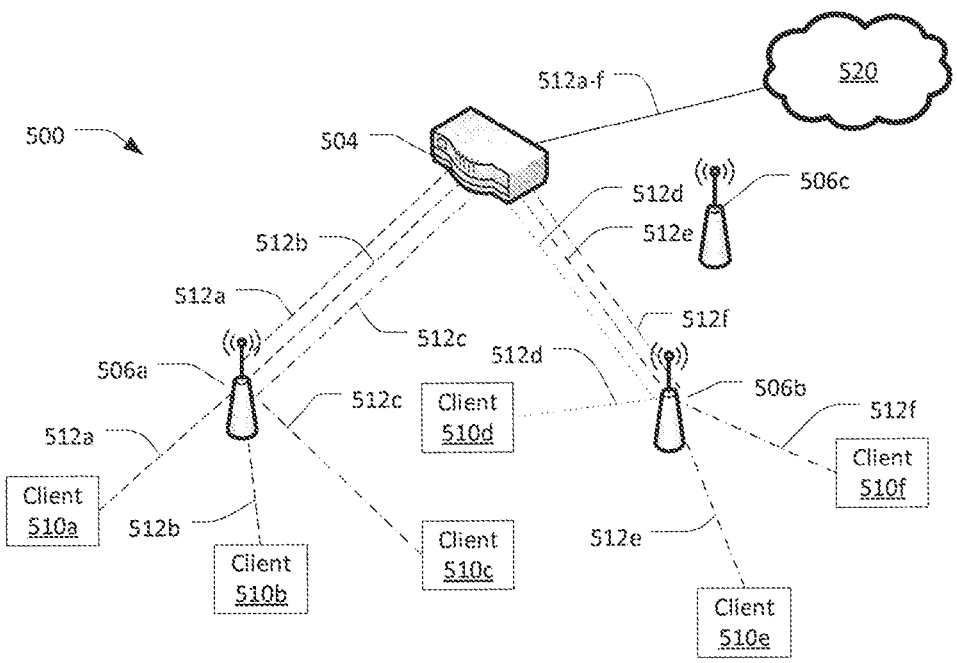
FIG. 10A illustrates another example of how the wireless network can optimize MU-MIMO transmission.

FIG. 10A illustrates example of how the wireless network 500 can encourage access points to enable MU-MIMO. In this example, the client devices 510a and 510b have traffic flows 512a, and 512b whose wireless path includes the access point 506a. Additionally, the traffic flows 512a and 512b have similar traffic characteristics. Traffic flows with similar characteristics are illustrated with dashed lines of the same style. Client device 510c, however, has a traffic flow 512c with characteristics that are different from traffic flows 512a and 512b. Hence, access point 506a may determine not to enable MU-MIMO because doing so may not improve throughput to each of these client devices 510a-c. Similarly, client devices 510e and 510f, whose wireless path includes access point 506b, have traffic flows 512e and 512f with similar characteristics, but the traffic flow 512d, which traverses the same wireless path as traffic flows 512e and 512f, has different characteristics. Hence, access point 506b also may choose not to enable MU-MIMO transmissions.

In some implementations, the controller 504, however, can recognize that if the traffic flow 512d for client device 510d were not being transmitted along the same wireless path as the traffic flows 512e and 512f, then access point B 506b could enable MU-MIMO. In another example, the controller 504 can also recognize that if the traffic flow 512c for client device 510c were not being transmitted along the same wireless path as the traffic flows 512a and 512b, then access point 506a could also enable MU-MIMO. The controller 504 may further recognize that the traffic flow 512c has similar characteristics as traffic flows 512e and 512f, but that the traffic flow 512c is being transmitted along a different wireless path than the path of traffic flows 512e and 512f.

Figure 10B:
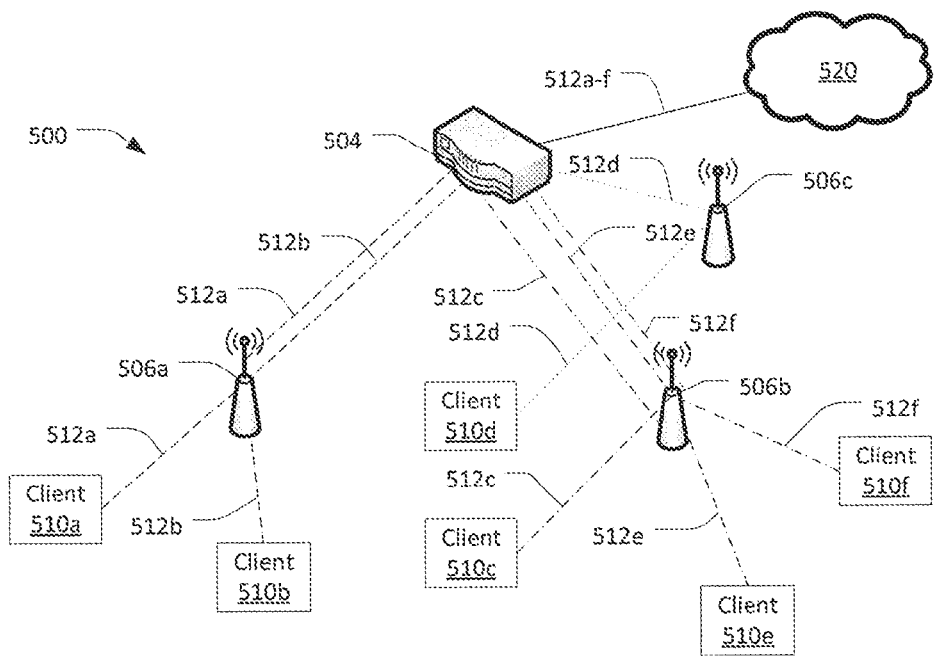
FIG. 10B illustrates wireless network after the controller has steered the client devices to more optimal access points.

FIG. 10B illustrates wireless network 500 after the controller 504 has steered the traffic flows 512c and 512d for client devices 510c and 510d to more optimal wireless paths. Because the traffic flow 512c has similar characteristics as the traffic flows 512e and 512f, the traffic flow 512c has been steered to the same wireless path that is traversed by the traffic flows 512e and 512f. Client device 512c thus has disassociated from the access point 506a and has instead associated with the access point 506b. The traffic flow 512d, in contrast, does not share characteristics with any other traffic flow. The traffic flow 512d has been steered to another convenient wireless path, one that includes an access point 506c. Client device 510d thus disassociates from the access point 506b and associates instead with the access point 506c.

Once the wireless network 500 has been reconfigured as described above, the controller 504 and/or the access points 506a-c can determine that one or more of the access points 506a-c can enable MU-MIMO. For example, all the traffic flows 512a-b whose wireless path includes the access point 506a have similar characteristics. Thus the access point 506a may enable MU-MIMO to improve throughput to the client devices 510a-b for these traffic flows 510a-b. Similarly, all the traffic flows 512c, 512e, and 512f whose wireless path includes the access point 506b have similar characteristics, and thus the access point 506b can also enable MU-MIMO. With both access points 506a and 506b enabling MU-MIMO, throughput to all client devices 510a-f may be improved.

Figure 11:
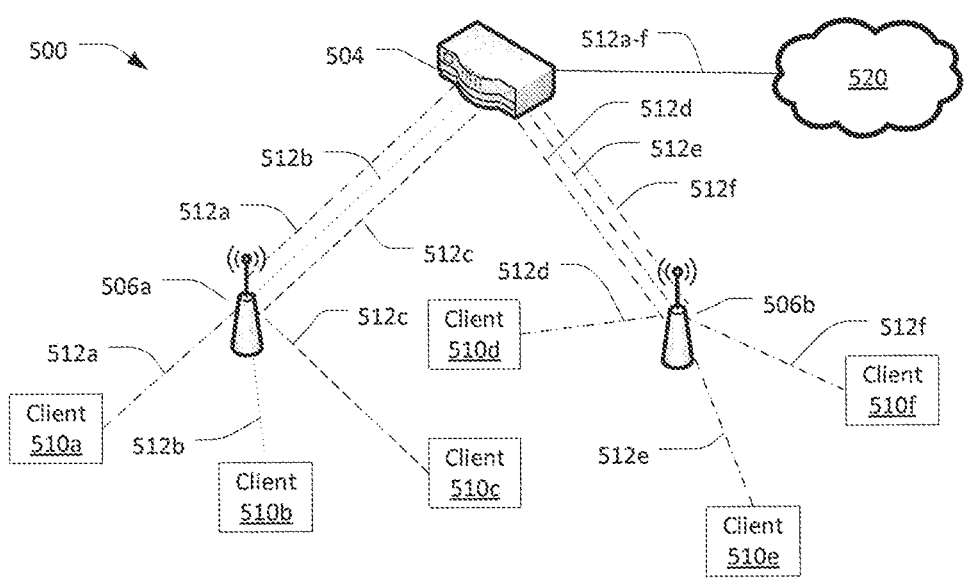
FIG. 11 illustrates an example of when the wireless network may not want to steer clients in order to optimize MU-MIMO transmissions.

FIG. 11 illustrates an example of when the wireless network 500 may not want to group traffic flows in order to encourage usage of MU-MIMO. In this example, the traffic flows 512d-f, whose wireless paths include access point 506b, have similar characteristics. Traffic flows that have similar characteristics are illustrated with dashed lines of the same style. Because all the traffic flows 512d-f that traverse access point 506b have similar characteristics, the access point 506b may enable MU-MIMO. The traffic flow 512a also has similar characteristics as the traffic flows 512d, 512e, and 512f. The traffic flow 512a, however, traverses a different wireless path than traffic flows 512d, 512e, and 512f. The above examples appear to indicate that overall utilization may be improved by steering the traffic flow 512a to the same wireless path as is traversed by the traffic flows 512d, 512e, and 512f. This would be accomplished by steering client device 510a to associate with access point 506b. In this particular example, however, client device 510a is poorly located for associating with access point 506b. As described in further detail below, the wireless network 500 is able to determine that the client device 510a is positioned far from access point 506b while being close to access point 506a, and thus access point 506a is a more suitable access point for the traffic flow 512a for the client device 510a.

In some embodiments, the controller 504 maintains an overall view of the wireless network 500. In the example of FIG. 11, the controller may thus recognize that steering traffic flow 512a to the wireless path that includes access point 506b may be detrimental to the overall utilization of the wireless network 500. The controller 504 obtains the necessary information to make this determination by having the access point 506b acquire CSI for the client device 510a. Specifically, the controller 504 may direct access point 506b to imitate the identity of access point 506a, a process called "spoofing." Having access point 506b imitate the identity of access point 506a will cause the client devices 510a-c, presently associated with access point 506a, to temporarily associate with access point 506b instead. Once these client devices 510a, 510b, and 510c are associated with access point 506b, access point 506b may be able to obtain CSI for each of the client devices 510a, 510b, and 510c.

To imitate the identity of access point 506a, access point 506b may use methods provided by any protocol implemented by the access point 506b. Access point 506b, for example, may temporarily transmit the Service Set Identifier (SSID) of access point 506a. In some embodiments, access point 506a may be deactivated, or otherwise engage in some activity that causes the access point 506a to drop the client devices 510a, 510b, and 510c. Access point 506b may acquire the SSID of access point 506a from the controller 504. Once the client devices 510a, 510b, and 510c are associated with access point 506b, access point 506b can acquire CSI for each of these client devices 510a-c. To acquire CSI, access point 506b can initiate whatever process is provided by the wireless protocol or protocols implemented by the access point 506b and the client devices 510a-c. For example, the access point 506b can initiate a sounding process as described above. The CSI acquired for each of the client devices 510a, 510b, and 510c informs access point 506b how signals propagate between the access point 506b and the client devices 510a-c, including how far away each of these client devices 510a-c are from the access point 510b.

The acquired CSI may be sent to the controller 504 for evaluation. The controller 504 may also have the CSI acquired by access point 506a for client devices 510a, 510b, and 510c. The controller 504 thus recognizes that steering traffic flow 512a for client device 510a to the wireless path that includes access point 506b will result in poor signal quality for the client device 510a. This is because client device 510a is positioned far from access point 506a. The controller 504 also recognizes that the client device 510a is positioned close to access point 506a. The controller 504 may therefore determine that client device 510a should remain associated with access point 506a, because doing so will result in the best overall utilization of the network. Distance is given as one example of factors that affect the signal quality between client devices and access points. Other factors include, for example, interference, noise, and/or the transmit power of both the access point and the client device. Additionally, signal quality is one example of a condition the controller may consider in determining whether to steer a client device to another access point. Other conditions include, for example, the level of traffic congestion at an access point, the bands and/or channels provided by an access point and supported by the client device, priorities assigned to different types of traffic, the level or types of services provided by an access point, and the capabilities of both the access point and the client device.

Figure 12A:
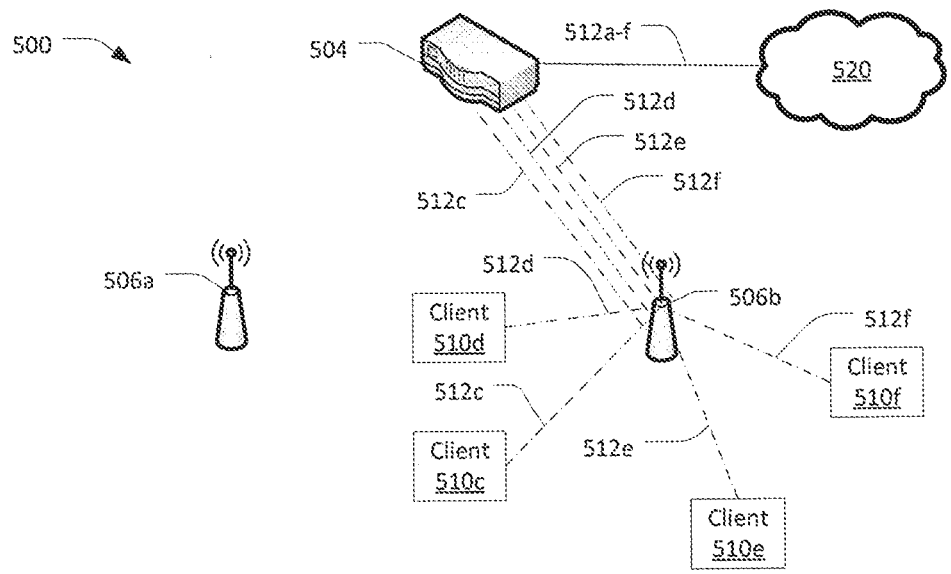
FIG. 12A illustrates an example other optimizations the wireless network may activate.

FIG. 12A illustrates an example of other improvements in overall utilization that may be available to the wireless network 500. In this example, the traffic flows 512d, 512e, and 512f have similar characteristics. The traffic flows 512d, 512e, and 512f also traverse the same wireless path, which includes access point 506b. Access point 506b, therefore, may enable MU-MIMO. Access point 506a, on the other hand, has no client devices associated with it. The controller 504 recognizes that access point 506a has no client devices associated with it, and thus may direct access point 506a to power down to reduce the resource usage of access point 506a, such as power usage, bandwidth usage, and/or signal usage.

Alternatively, it may be that the traffic flows 510c-f that traverse the wireless path that includes access point 506b include a large amount of data. The controller 504 may recognize in this situation that access point 506b is heavily loaded while access point 506a has no load. The controller 504 may further be configured to distribute the load between the available access points 506a and 506b.

To determine which client devices 510d-f to steer to access point a 506a, may have or may acquire CSI from access point 506a. The CSI from access point 506a may be acquired by having access point 506a imitate the identity—that is "spoof," as described above—of access point 506b. By spoofing access point 506b, access point 506a can acquire CSI that describes signals between itself and the client devices 510d-f. This CSI may indicate that access point 506a is equally or better suited than access point 506b for some of the client devices 510d-f associated with access point 506b. For example, some of the client devices 510d-f associated with access point 506b may be physically close enough to access point 506a for access point 506a to provide as strong a signal to these client devices 510d-f as is provided by access point 506b. Having this information, the controller 504 may decide that overall utilization of the wireless network 500 may be improved by distributing the load generated by the traffic flows 512d-f between the available access points 506a and 506b. This distribution process may be included in the term "load balancing."

Figure 12B:
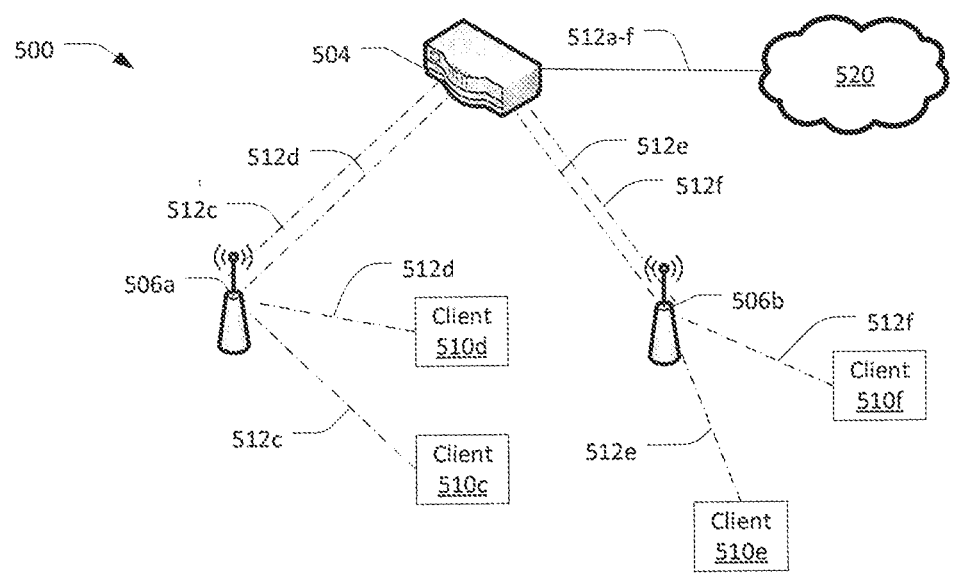
FIG. 12B illustrates the wireless network after the controller has steered client devices to another access point.

FIG. 12B illustrates the wireless network 500 after the controller 504 has engaged in load balancing. Using the CSI obtained from access point 506a, the controller 504 recognizes that the client devices 510c and 510d are situated close enough to access point 506a that access point 506a provides a reasonable alternative wireless path than is provided by access point 506b. The controller 504 thus has steered the traffic flows 512c and 510d to the wireless path that includes access point 506b. The utilization of access point 506a is thus reduced, improving the throughput to the client devices 510e-f associated with access point 506b. As noted above, client devices 510c and 510d have traffic flows 512c-d with similar characteristics. Hence, access point 506a may enable MU-MIMO to improve the throughput to these client devices 510c-d.

VII. Computer System

Figure 13:
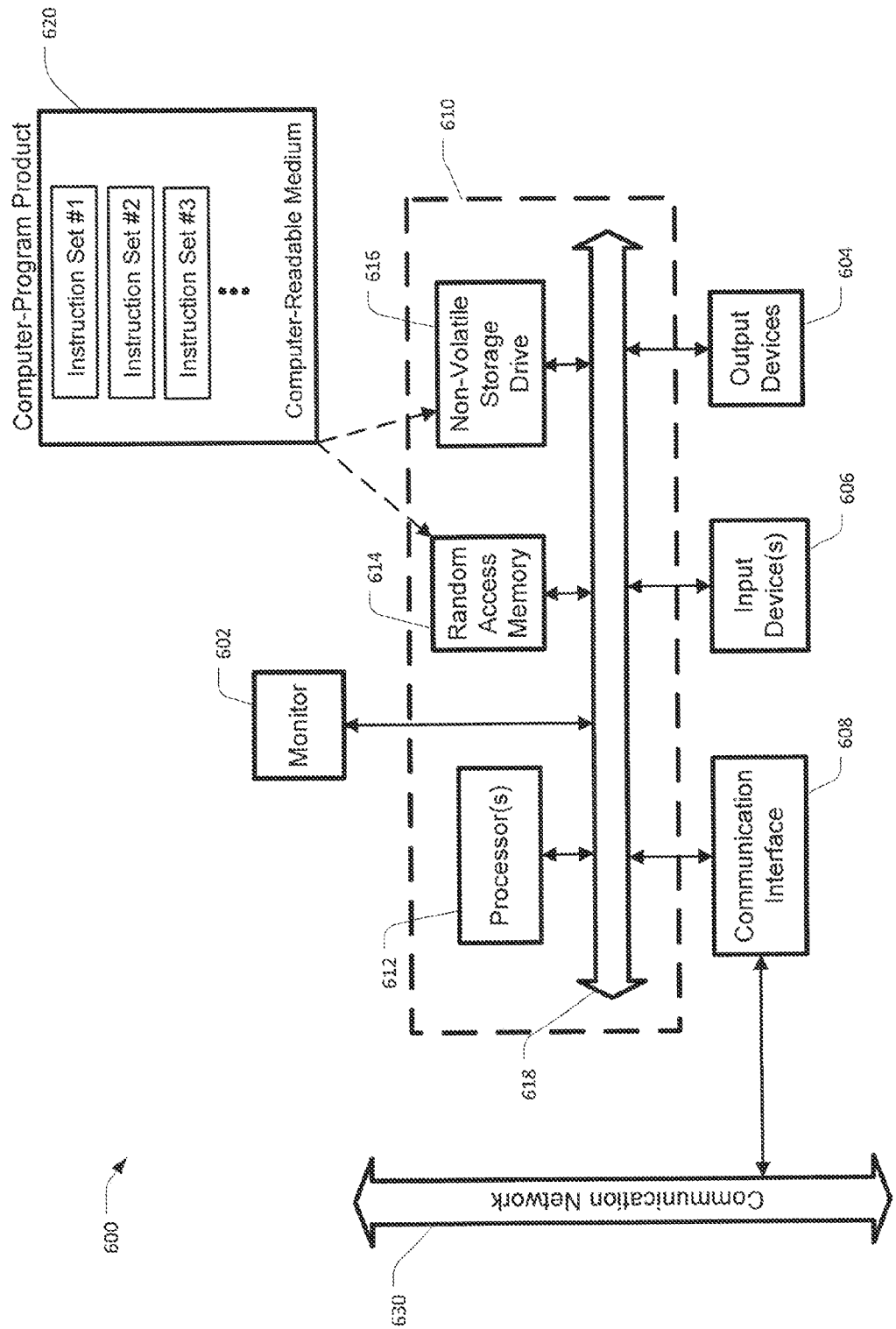
FIG. 13 illustrates an embodiment of a special-purpose computer system.

FIG. 13 illustrates an embodiment of a special-purpose computer system 600. The above methods may be implemented by computer-program products that direct a computer system to perform the actions of the above-described methods and components. Each such computer-program product may comprise sets of instructions (code or program code) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system, it is operates as the special-purpose computer system 600.

The special-purpose computer system 600 comprises a computer 610, a monitor 602 coupled to the computer 610, one or more optional user output devices 604 coupled to the computer 610, one or more user input devices 606 (e.g., keyboard, mouse, track ball, touch screen) coupled to the computer 610, an optional communications interface 608 coupled to the computer 610, a computer-program product 620 stored in a tangible computer-readable memory in the computer 610. The computer-program product 620 directs the special-purpose computer system 600 to perform the above-described methods. The computer 610 may include one or more processors 612 that communicate with a number of peripheral devices via a bus subsystem 618. These peripheral devices may include the user output device(s) 604, user input device(s) 606, communications interface 608, and a storage subsystem, such as a random access memory (RAM) 614 and/or a non-volatile storage drive 616 (e.g., disk drive, optical drive, solid state drive), which are forms of tangible computer-readable memory.

The computer-program product 620 may be stored in the non-volatile storage drive 616 and/or another computer-readable medium accessible to the computer 610 and loaded into the memory 614. Each processor 612 may comprise a microprocessor, such as a microprocessor from Intel® or Advanced Micro Devices, Inc.®, or the like. To support the computer-program product 620, the computer 610 runs an operating system that handles the communications of the computer-program product 620 with the above-noted components, as well as the communications between the above-noted components in support of the computer-program product 620. Exemplary operating systems include Windows or the like from Microsoft Corporation, Solaris® from Sun Microsystems, LINUX, UNIX, and the like.

The user input devices 606 include all possible types of devices and mechanisms to input information to the computer system 610. These may include a keyboard, a keypad, a mouse, a scanner, a digital drawing pad, a touch screen incorporated into the display, audio input devices such as voice recognition systems, microphones, and other types of input devices. In various embodiments, the user input devices 606 are typically embodied as a computer mouse, a trackball, a track pad, a joystick, wireless remote, a drawing tablet, a voice command system. The user input devices 606 typically allow a user to select objects, icons, text and the like that appear on the monitor 602 via a command such as a click of a button or the like. The user output devices 604 include all possible types of devices and mechanisms to output information from the computer 610. These may include a display (e.g., a monitor 602), printers, non-visual displays such as audio output devices, etc.

The communications interface 608 provides an interface to other communication networks and devices and may serve as an interface to receive data from and transmit data to other systems, WANs and/or the Internet. Embodiments of the communications interface 608 typically include an Ethernet card, a modem (telephone, satellite, cable, ISDN), a synchronous or asynchronous digital subscriber line (DSL) unit, a FireWire® interface, a USB® interface, a wireless network adapter, and the like. For example, the communications interface 608 may be coupled to a computer network, to a FireWire® bus, or the like. In other embodiments, the communications interface 608 may be physically integrated on the motherboard of the computer 610, and/or may be a software program, or the like.

The RAM 614 and non-volatile storage drive 616 are examples of tangible computer-readable media configured to store data such as computer-program product embodiments of the systems and methods described herein, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. The RAM 614 and non-volatile storage drive 616 may be configured to store the basic programming and data constructs that provide the functionality of various embodiments of the systems and methods described above.

Software instruction sets that provide the functionality of the described methods may be stored in the RAM 614 and/or non-volatile storage drive 616. These instruction sets or code may be executed by the processor(s) 612. The RAM 614 and/or non-volatile storage drive 616 may also provide a repository to store data and data structures used in accordance with the disclosed systems and methods. The RAM 614 and non-volatile storage drive 616 may include a number of memories including a main random access memory (RAM) to store of instructions and data during program execution and a read-only memory (ROM) in which fixed instructions are stored. The RAM 614 and non-volatile storage drive 616 may include a file storage subsystem providing persistent (non-volatile) storage of program and/or data files. The RAM 614 and non-volatile storage drive 616 may also include removable storage systems, such as removable flash memory.

The bus subsystem 618 provides a mechanism to allow the various components and subsystems of the computer 610 to communicate with each other as intended. Although the bus subsystem 618 is shown schematically as a single bus, alternative embodiments of the bus subsystem 618 may implement multiple busses or communication paths within the computer 610.

The preceding description provides example embodiments only, and is not intended to limit the scope, applicability, or configuration of the disclosure. Rather, the preceding description of the example embodiments will provide those skilled in the art with an enabling description for implementing an example embodiment. It should be understood that various changes may be made in the function and arrangement of elements without departing from the spirit and scope of the systems and methods as set forth in the appended claims.

Specific details are given in the preceding description to provide a thorough understanding of the embodiments. It will be understood, however, by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive.

It is also noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the various systems and methods are described with reference to specific embodiments thereof, but those skilled in the art will recognize that the disclosed systems and methods are not limited thereto. Various features and aspects of the above-described systems and methods may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   identifying, at a computing device, a plurality of traffic flows transmitted over a plurality of wireless paths with similar packet traffic characteristics;
   identifying a single wireless path along which the plurality of traffic flows can be transmitted utilizing spatial signal multiplexing, wherein identifying the single wireless path includes utilizing sounding information associated with the wireless path to determine when the single wireless path can implement the spatial signal multiplexing;
   grouping the plurality of traffic flows according to the identified similar packet traffic characteristics;
   setting up a contention window utilizing traffic flow priority for a plurality of access categories assigned to the plurality of traffic flows according to the identified similar packet traffic characteristics, wherein the identified similar packet traffic characteristics includes a priority of the plurality of access categories and an amount of traffic on the corresponding priorities;

altering the group of the plurality of traffic flows from the plurality of wireless paths to the single wireless path; and transmitting the group of the plurality of traffic flows utilizing spatial signal multiplexing via the single wireless path.

2. The method of claim 1, wherein packet traffic characteristics include packet size and packet inter-arrival time.

3. The method of claim 1, wherein grouping comprises:
steering traffic flows that do not have the similar packet traffic characteristics to a wireless path not used for grouping the plurality of traffic flows.

4. The method of claim 1, further comprising:
instructing a selected wireless path along which the plurality of traffic flows are transmitted to imitate the identity of another wireless path along which at least one of the plurality of traffic flows are transmitted;
obtaining sounding information for the at least one of the plurality of traffic flows that are being transmitted along the other wireless path; and
determining whether to steer the at least one of the plurality of traffic flows from the other wireless path to the selected wireless path.

5. The method of claim 4, further comprising:
determining from the sounding information that moving the at least one of the plurality of traffic flows allows spatial signal multiplexing on the selected wireless path; and
grouping the at least one of the plurality of traffic flows by steering the at least one of the plurality of traffic flows to transmit along the selected wireless path.

6. The method of claim 4, further comprising:
determining that moving the at least one of the plurality of traffic flows reduces overall utilization; and
not grouping the at least one of the plurality of traffic flows along the selected wireless path.

7. The method of claim 1, further comprising:
steering one or more of the plurality of traffic flows to another wireless path to improve overall utilization.

8. The method of claim 1,
wherein the size of the contention window is set up based on the priority of the plurality of access categories and the amount of traffic on the corresponding priorities.

9. A network device comprising:
one or more processors; and
a non-transitory computer-readable medium containing instructions that, when executed by the one or more processors, cause the one or more processors to perform operations including:
identifying a plurality of traffic flows transmitted over a plurality of wireless paths with similar packet traffic characteristics;
identifying a single wireless path along which the plurality of traffic flows can be transmitted utilizing spatial signal multiplexing, wherein identifying the single wireless path includes utilizing sounding information associated with the wireless path to determine when the single wireless path can implement the spatial signal multiplexing;
grouping the plurality of traffic flows according to the identified similar packet traffic characteristics;
setting up a contention window utilizing traffic flow priority for a plurality of access categories assigned to the plurality of traffic flows according to the identified similar packet traffic characteristics, wherein the identified similar packet traffic characteristics includes a priority of the plurality of access categories and an amount of traffic on the corresponding priorities;
altering the group of the plurality of traffic flows from the plurality of wireless paths to the single wireless path; and
transmitting the group of the plurality of traffic flows utilizing spatial signal multiplexing via the single wireless path.

10. The network device of claim 9, wherein packet traffic characteristics include packet size and packet inter-arrival time.

11. The network device of claim 9, wherein grouping comprises:
steering traffic flows that do not have the similar packet traffic characteristics to a wireless path not used for grouping the plurality of traffic flows.

12. The network device of claim 9, further comprising instructions that, when executed by the one or more processors, cause the one or more processors to perform operations including:
instructing a selected wireless path along which the plurality of traffic flows are transmitted to imitate the identity of another wireless path along which at least one of the plurality of traffic flows are transmitted;
obtaining sounding information for the at least one of the plurality of traffic flows that are being transmitted along the other wireless path; and
determining whether to steer the at least one of the plurality of traffic flows from the other wireless path to the selected wireless path.

13. The network device of claim 12, further comprising instructions that, when executed by the one or more processors, cause the one or more processors to perform operations including:
determining from the sounding information that moving the at least one of the plurality of traffic flows allows spatial signal multiplexing at the selected wireless path; and
grouping the at least one of the plurality of traffic flows by steering the at least one of the plurality of traffic flows to transmit along the selected wireless path.

14. The network device of claim 12, further comprising instructions that, when executed by the one or more processors, cause the one or more processors to perform operations including:
determining that moving the at least one of the plurality of traffic flows reduces overall utilization; and
not grouping the at least one of the plurality of traffic flows along the selected wireless path.

15. The network device of claim 9, further comprising instructions that, when executed by the one or more processors, cause the one or more processors to perform operations including:
steering one or more of the two or more traffic flows to another wireless path to improve overall utilization.

16. The network device of claim 9, further comprising instructions that, when executed by the one or more processors, cause the one or more processors to perform operations including:
identifying a wireless path with no traffic flows being transmitted along the identified wireless path; and
disabling the identified wireless path.

17. A computer-program product tangibly embodied in a non-transitory machine-readable storage medium of a network device, including instructions configured to cause one or more processors to:

identify plurality of traffic flows transmitted over a plurality of wireless paths with similar packet traffic characteristics;

identify a single wireless path along which the plurality of traffic flows can be transmitted utilizing spatial signal multiplexing, wherein identifying the single wireless path includes utilizing sounding information associated with the wireless path to determine when the single wireless path can implement the spatial signal multiplexing;

group the plurality of traffic flows according to the identified similar packet traffic characteristics;

set up a contention window utilizing traffic flow priority for a plurality of access categories assigned to the plurality of traffic flows according to the identified similar packet traffic characteristics, wherein the identified similar packet traffic characteristics includes a priority of the plurality of access categories and an amount of traffic on the corresponding priorities;

alter the group of the plurality of traffic flows from the plurality of wireless paths to the single wireless path; and transmit the group of the plurality of traffic flows utilizing spatial signal multiplexing via the single wireless path.

18. The computer-program product of claim 17, wherein the size of the contention window is set up based on the priority of the plurality of access categories and the amount of traffic on the corresponding priorities.

19. The computer-program product of claim 17, wherein grouping comprises:

steering traffic flows that do not have the similar packet traffic characteristics to a wireless path not used for grouping the plurality of traffic flows.

20. The computer-program product of claim 17, further comprising instructions that, when executed by the one or more processors, cause the one or more processors to perform operations including:

instructing a selected wireless path along which the plurality of traffic flows are transmitted to imitate the identity of another wireless path along which at least one of the plurality of traffic flows are transmitted;

obtaining sounding information for the at least one of the plurality of traffic flows that are being transmitted along the other wireless path; and determining whether to steer the at least one of the plurality of traffic flows from the other wireless path to the selected wireless path.

21. The computer-program product of claim 20, further comprising instructions that, when executed by the one or more processors, cause the one or more processors to perform operations including:

determining from the sounding information that moving the at least one of the plurality of traffic flows allows spatial signal multiplexing at the selected wireless path; and grouping the at least one of the plurality of traffic flows by steering the at least one of the plurality of traffic flows to transmit along the selected wireless path.

22. The computer-program product of claim 20, further comprising instructions that, when executed by the one or more processors, cause the one or more processors to perform operations including:

determining that moving the at least one of the plurality of traffic flows reduces overall utilization; and not grouping the at least one of the plurality of traffic flows along the selected wireless path.

23. The computer-program product of claim 17, further comprising instructions that, when executed by the one or more processors, cause the one or more processors to perform operations including:

steering one or more of the plurality of traffic flows to another wireless path to improve overall utilization.

24. The computer-program product of claim 17, further comprising instructions that, when executed by the one or more processors, cause the one or more processors to perform operations including:

identifying an intermediate path with no traffic flows being transmitted along the identified wireless path; and disabling the identified wireless path.

* * * * *